US012671886B2

(12) United States Patent
Mogi et al.

(10) Patent No.: US 12,671,886 B2
(45) Date of Patent: Jun. 30, 2026

(54) IMAGE PICKUP APPARATUS AND IMAGE PICKUP SYSTEM THAT ARE CAPABLE OF EFFICIENTLY COOLING RECORDING MEDIUM WHILE SUPPRESSING INCREASE IN SIZE

(71) Applicant: CANON KABUSHIKI KAISHA, Tokyo (JP)

(72) Inventors: Yusuke Mogi, Kanagawa (JP); Masato Yokosawa, Tokyo (JP); Yuta Nakamura, Kanagawa (JP); Kazuna Oyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 18/751,736

(22) Filed: Jun. 24, 2024

(65) Prior Publication Data

US 2025/0016433 A1     Jan. 9, 2025

(30) Foreign Application Priority Data

Jul. 4, 2023     (JP) ................................. 2023-110137

(51) Int. Cl.
*H04N 23/52*       (2023.01)
*H04N 23/51*       (2023.01)
*H04N 23/54*       (2023.01)

(52) U.S. Cl.
CPC ............. *H04N 23/52* (2023.01); *H04N 23/51* (2023.01); *H04N 23/54* (2023.01)

(58) Field of Classification Search
CPC ........ H04N 23/51; H04N 23/52; H04N 23/54; H05K 1/0203; H05K 1/0204; H05K 1/0201; H05K 7/2039; H05K 7/20145
See application file for complete search history.

(56) References Cited

U.S. PATENT DOCUMENTS

| | | | |
|---|---|---|---|
| 10,771,659 B2 * | 9/2020 | Arai ........................ | G03B 17/55 |
| 2022/0124225 A1 * | 4/2022 | Gunji ..................... | G03B 17/14 |
| 2022/0294956 A1 * | 9/2022 | Tamura .................. | H04N 23/53 |
| 2022/0294957 A1 * | 9/2022 | Iwasaki .................. | H04N 23/68 |
| 2023/0164408 A1 * | 5/2023 | Endo .................. | H05K 7/20154 |
| | | | 348/333.06 |

FOREIGN PATENT DOCUMENTS

JP          2021034789 A      3/2021

* cited by examiner

*Primary Examiner* — Kelly L Jerabek
(74) *Attorney, Agent, or Firm* — Cowan, Liebowitz & Latman, P.C.

(57)          ABSTRACT
An image pickup apparatus capable of efficiently cooling a recording medium while suppressing an increase in size is provided. The image pickup apparatus includes a gripping portion, a medium slot that is provided in inside of the gripping portion, an intake port, an exhaust port, a cooling duct that connects the intake port and the exhaust port, and a first heat transfer member that transfers heat from the medium slot to the cooling duct. The cooling duct includes a cooling fan that flows air into inside of the cooling duct from the intake port toward the exhaust port, and an intake side duct that is connected to the intake port and is provided so as to at least partially overlap the medium slot in the gripping portion when viewed from an optical axis direction of the image pickup apparatus.

17 Claims, 21 Drawing Sheets

IMAGE PICKUP APPARATUS AND IMAGE PICKUP SYSTEM THAT ARE CAPABLE OF EFFICIENTLY COOLING RECORDING MEDIUM WHILE SUPPRESSING INCREASE IN SIZE

BACKGROUND OF THE INVENTION

Field of the Invention

The present invention relates to an image pickup apparatus and an image pickup system, and more particularly to a technique for cooling a recording medium attached to an image pickup apparatus.

Description of the Related Art

There is a need for higher image quality of recorded video images. In response to such a need, in the case of realizing the higher image quality by increasing a resolution, a frame rate, or the like, the power consumption due to the load of signal processing inside an image pickup apparatus has been increasing. In particular, since the amount of heat generated by an image pickup unit, an image processing unit, a recording medium, etc. is large and the performance of the image pickup unit, the image processing unit, the recording medium, etc. generally deteriorates when the temperature reaches a high temperature, it is necessary to provide a structure, which cools the image pickup unit, the image processing unit, the recording medium, etc., inside the image pickup apparatus. Therefore, an image pickup apparatus, which is primarily intended for moving image photographing (that is, recording of a video image) and has a structure that cools a recording medium, has been proposed. For example, Japanese Laid-Open Patent Publication (kokai) No. 2021-34789 discloses an image pickup apparatus that cools a recording medium by providing an air-cooling duct so as to overlap a main surface of the recording medium when viewed from a direction perpendicular to the main surface of the recording medium.

There is a concern that the amount of heat generated by the recording medium will further increase in the future as a writing bit rate increases due to the higher image quality. Therefore, it is necessary to efficiently cool the recording medium, but at the same time, it is necessary to avoid or suppress an increase in the size of the image pickup apparatus.

However, in the image pickup apparatus disclosed in Japanese Laid-Open Patent Publication (kokai) No. 2021-34789, since the structure of the air-cooling duct is complicated in order to cool a plurality of heat generating parts inside the image pickup apparatus, it is not easy to enhance the cooling efficiency of the recording medium while avoiding or suppressing the increase in the size of the image pickup apparatus.

SUMMARY OF THE INVENTION

The present invention provides an image pickup apparatus and an image pickup system that are capable of efficiently cooling a recording medium while suppressing an increase in size.

Accordingly, the present invention provides an image pickup apparatus comprising a gripping portion, a medium slot that is provided in inside of the gripping portion, an intake port, an exhaust port, a cooling duct that connects the intake port and the exhaust port, and a first heat transfer member that transfers heat from the medium slot to the cooling duct. The cooling duct includes a cooling fan that flows air into inside of the cooling duct from the intake port toward the exhaust port, and an intake side duct that is connected to the intake port and is provided so as to at least partially overlap the medium slot in the gripping portion when viewed from an optical axis direction of the image pickup apparatus.

Accordingly, the present invention provides an image pickup system comprising an image pickup apparatus, and a cooling module that is attached to the image pickup apparatus. The image pickup apparatus comprises a gripping portion, a battery housing portion that is provided in the gripping portion, and a medium slot that is provided in inside of the gripping portion so as to be close to the battery housing portion. The cooling module comprises a partition plate that is inserted into the battery housing portion and forms a substantially U-shaped air flow path in the battery housing portion, and a cooling fan that flows air through the air flow path. The medium slot is cooled by heat exchange being performed between air flowing through the air flow path and the medium slot through a wall surface of the battery housing portion by driving the cooling fan.

According to the present invention, it is possible to realize the image pickup apparatus and the image pickup system that are capable of efficiently cooling the recording medium while suppressing the increase in size.

Further features of the present invention will become apparent from the following description of exemplary embodiments with reference to the attached drawings.

BRIEF DESCRIPTION OF THE DRAWINGS

FIG. 14A is a cross-sectional view taken along arrows MG-MG shown in FIG. 12A, FIG. 14B is an enlarged view of an area EF in the cross-sectional view of FIG. 14A.

DESCRIPTION OF THE EMBODIMENTS

The present invention will now be described in detail below with reference to the accompanying drawings showing embodiments thereof.

Figure 1A:
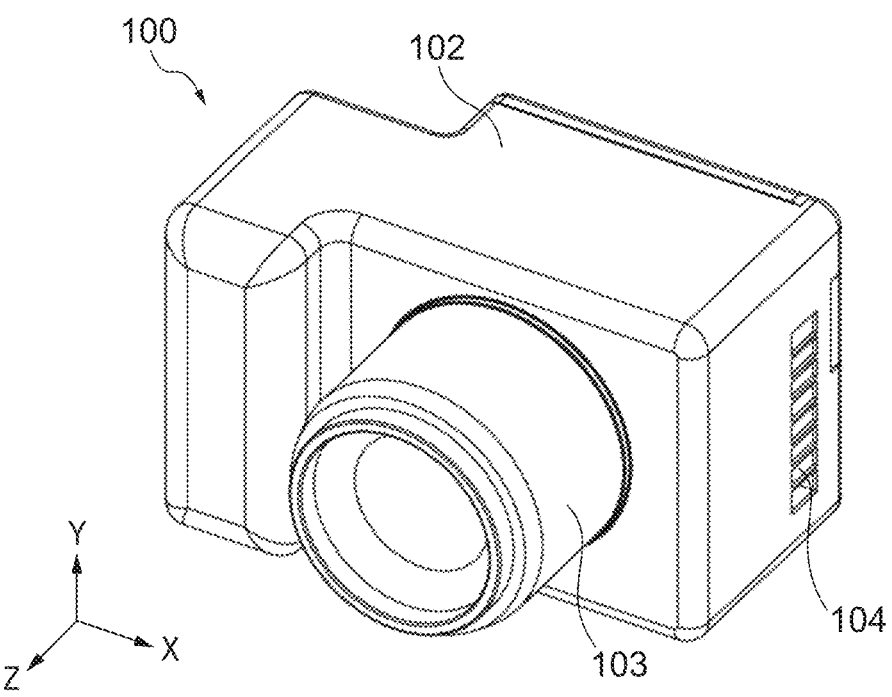
FIG. 1A and FIG. 1B are external appearance perspective views of an image pickup apparatus according to a first embodiment.
Figure 1B:
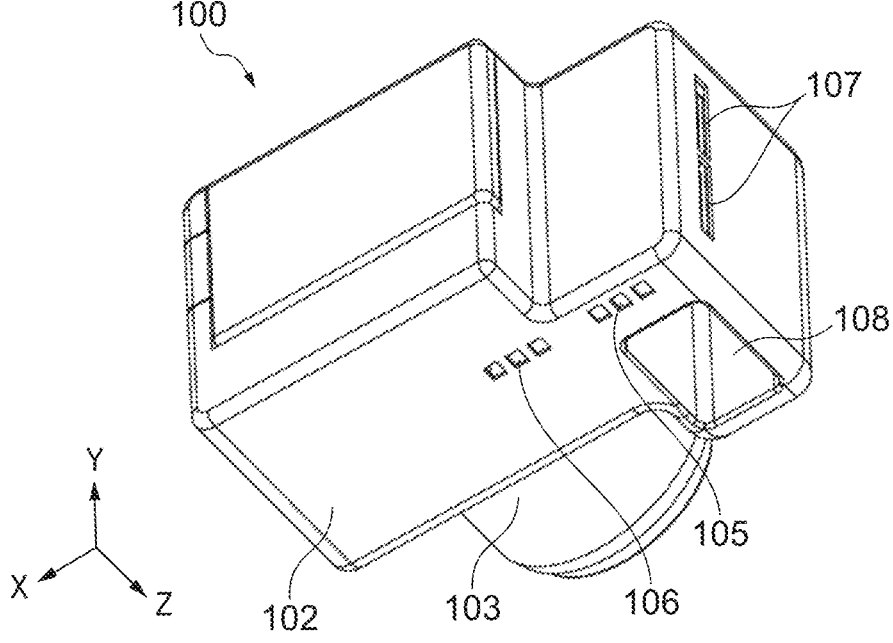

First, a first embodiment will be described. FIG. 1A and FIG. 1B are perspective views that show an external appearance of an image pickup system 100 according to the first embodiment. FIG. 1A is a front perspective view of the image pickup system 100, and FIG. 1B is a rear perspective view of the image pickup system 100. The image pickup system 100 includes an image pickup apparatus 102 and a lens barrel 103 that is attached to the front surface of the image pickup apparatus 102. The lens barrel 103 is configured to be a so-called interchangeable lens that can be interchanged with respect to the image pickup apparatus 102 (that is, that can be attached to and detached from the image pickup apparatus 102) depending on a photographing scene. However, the image pickup apparatus 102 and the lens barrel 103 may be configured to be integral and inseparable.

For convenience of description, as shown in FIG. 1A and FIG. 1B, an XYZ orthogonal coordinate system is defined with respect to the image pickup system 100. As shown in FIG. 1A and FIG. 1B, it is assumed that a Z direction is a front-back direction of the image pickup apparatus 102, a Y direction is a height direction of the image pickup apparatus 102, and an X direction is a width direction of the image pickup apparatus 102. The Z direction is a direction parallel to an optical axis of the lens barrel 103 and a direction perpendicular to an image pickup surface of an image pickup device 109 (see FIG. 2A and FIG. 2B), and a direction from the image pickup system 100 toward a subject (not shown) (that is, a direction from the rear surface side of the image pickup system 100 toward the front surface side of the image pickup system 100) is defined as a positive direction of the Z direction (+Z). Regarding the X direction, a direction from left toward right when viewing the image pickup system 100 from the positive direction of the Z direction is defined as a positive direction of the X direction (+X). Regarding the Y direction, a direction from the bottom surface of the image pickup apparatus 102 toward the top surface of the image pickup apparatus 102 is defined as a positive direction of the Y direction (+Y).

Figure 2A:
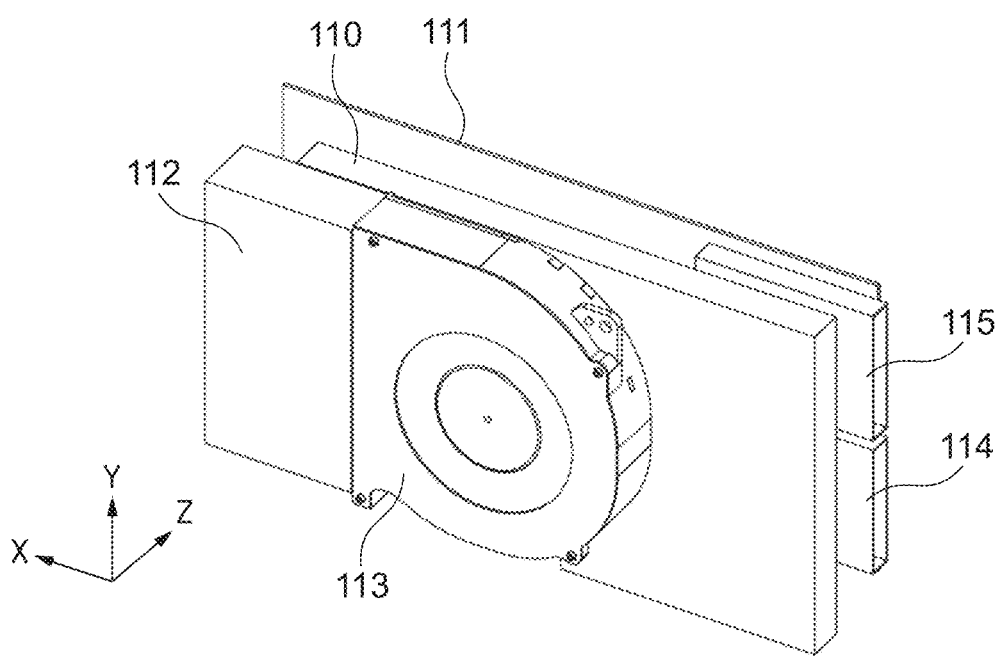
FIG. 2A and FIG. 2B are perspective views that show a configuration of a main part of the image pickup apparatus shown in FIG. 1A and FIG. 1B.
Figure 2B:
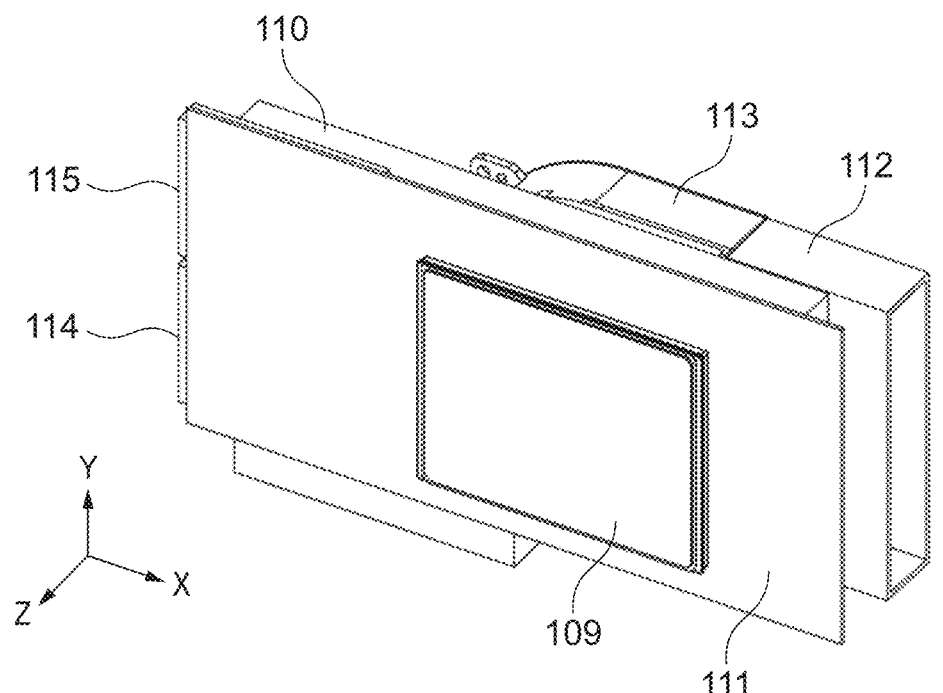

The lens barrel 103 forms an image of incident light on the image pickup surface of the image pickup device 109 (see FIG. 2A and FIG. 2B). A first intake port 105 and a second intake port 106 for sucking outside air into the image pickup apparatus 102 are provided on the bottom surface of the image pickup apparatus 102. In addition, an exhaust port 104 for discharging heat generated inside the image pickup apparatus 102 to the outside is provided on the right side surface of the image pickup apparatus 102 when viewed from the subject side. The first intake port 105 and the second intake port 106 are connected to the exhaust port 104 by a cooling duct. Details of a configuration of the cooling duct will be described below.

Recording medium insertion ports 107 that each are used for attaching and detaching a recording medium (not shown) to and from a medium slot provided inside the image pickup apparatus 102 are provided on the left side surface of the image pickup apparatus 102 when viewed from the subject side, that is, the recording medium insertion ports 107 are provided on the −X side surface. In addition, a battery insertion port 108 for attaching and detaching a battery (not shown) is provided on the left side of the bottom surface of the image pickup apparatus 102.

It should be noted that the image pickup apparatus 102 is provided with a battery lid (not shown) that opens and closes the battery insertion port 108. In addition, the image pickup apparatus 102 includes a power button, a shutter button, and a menu button and a selection button for performing various kinds of settings of the image pickup system 100, but the power button, the shutter button, the menu button, and the selection button are not shown in the figure because they have no direct relation to the present invention. Therefore, their description will also be omitted.

Figure 3A:
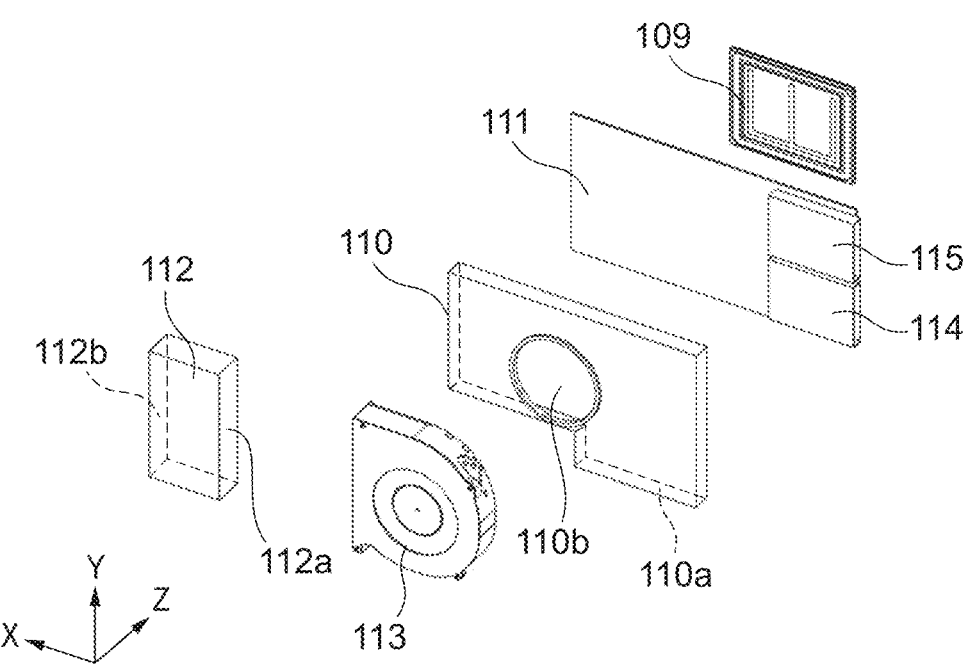
FIG. 3A and FIG. 3B are exploded perspective views that show the configuration of the main part of the image pickup apparatus shown in FIG. 1A and FIG. 1B.
Figure 3B:
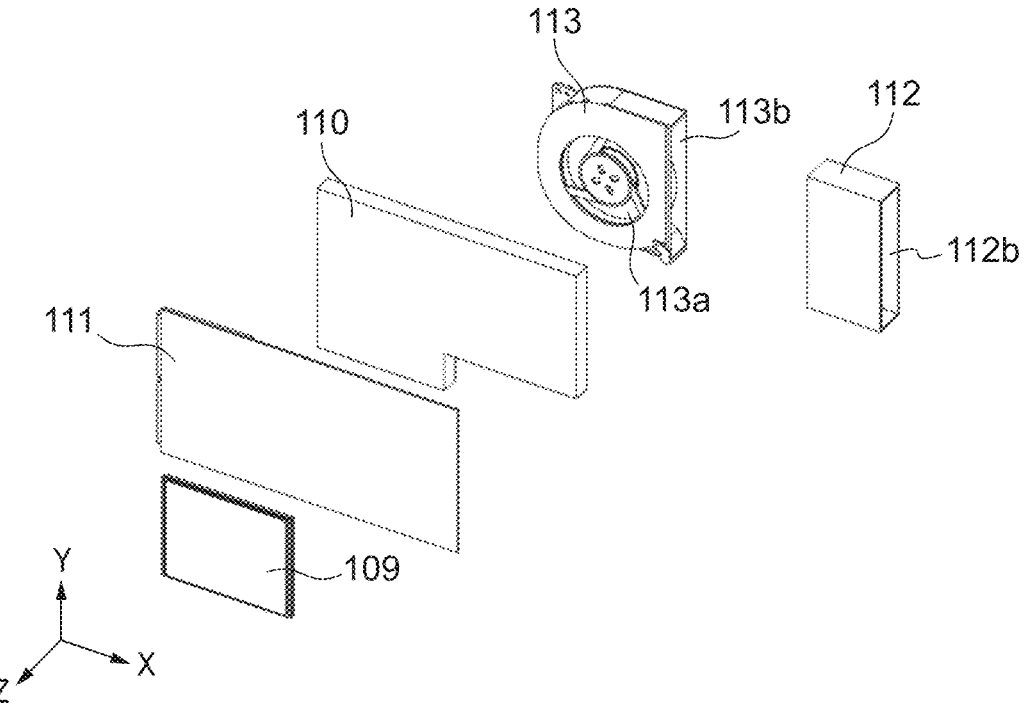

FIG. 2A and FIG. 2B are perspective views that show a configuration of a main part of the image pickup apparatus 102. FIG. 2A is a front perspective view of the main part of the image pickup apparatus 102, and FIG. 2B is a rear perspective view of the main part of the image pickup apparatus 102. FIG. 3A is an exploded perspective view of the main part corresponding to FIG. 2A, and FIG. 3B is an exploded perspective view of the main part corresponding to FIG. 2B. Here, as the main part, the image pickup device 109, an intake side duct 110, a control circuit board 111, an exhaust side duct 112, a cooling fan 113, a first medium slot 114, and a second medium slot 115 are shown.

The control circuit board 111 has the image pickup device 109 mounted on its +Z side surface, and has the first medium slot 114 and the second medium slot 115 that are mounted on its-Z side surface opposite to its +Z side surface. In addition, various kinds of electronic components such as a control circuit (not shown) that performs overall control of the image pickup system 100 are mounted on the control circuit board 111. The image pickup device 109 is, for example, a CMOS image sensor or the like, and converts light incident from the lens barrel 103 into electrical signals to generate image signals. The first medium slot 114 and the second medium slot 115 each house a recording medium (not shown). It becomes possible to insert and remove the recording medium (not shown) into and from the first medium slot 114 and the second medium slot 115 through the recording medium insertion ports 107, respectively. In the following description, in the case that the first medium slot 114 and the second medium slot 115 are not distinguished, they each may be simply referred to as "the medium slot".

The intake side duct 110, the exhaust side duct 112, and the cooling fan 113 constitute the cooling duct that releases the heat generated inside the image pickup apparatus 102 to the outside air. An intake side duct inlet 110*a* is provided on the bottom surface (the −Y side surface) of the intake side duct 110. The intake side duct 110 is disposed so that the intake side duct inlet 110*a* is airtightly connected to the first intake port 105 and the second intake port 106. An intake side duct outlet 110*b* is provided on the rear surface (the −Z side surface) of the intake side duct 110, and the cooling fan 113 is attached to the intake side duct outlet 110*b*.

The cooling fan 113 is a so-called centrifugal fan, which sucks in air from an intake port 113*a* facing the intake side duct outlet 110*b*, and discharges the sucked air from a side surface exhaust port 113*b*. The exhaust side duct 112 includes an exhaust side duct inlet 112*a* and an exhaust side duct outlet 112*b*. The exhaust side duct 112 is disposed so that the exhaust side duct inlet 112*a* is airtightly connected to the side surface exhaust port 113*b* of the cooling fan 113, and the exhaust side duct outlet 112*b* is airtightly connected to the exhaust port 104.

Therefore, by driving the cooling fan 113, the outside air (the air) flows into the intake side duct 110 from the first intake port 105 and the second intake port 106. The air flowing into the intake side duct 110 passes through the cooling fan 113 and the exhaust side duct 112, and is discharged to the outside air from the exhaust port 104. In this way, the air flowing inside the cooling duct is warmed by the heat generated by heat generating components inside the image pickup apparatus 102 while passing through inside the image pickup apparatus 102 and is released to the outside, thereby cooling the heat generating components (in other words, temperature rise is suppressed).

Next, a method of transferring heat from the first medium slot 114 and the second medium slot 115 to the cooling duct will be described. It should be noted that a recording medium is housed in the medium slot, and the recording medium generates heat as signal processing is performed with respect to the recording medium. Therefore, an object (a target) to be cooled by the cooling duct is the recording medium housed in the medium slot, but since the recording medium is cooled through the medium slot, in the following description, an expression such as "the medium slot is cooled" is used for convenience.

Figure 4A:
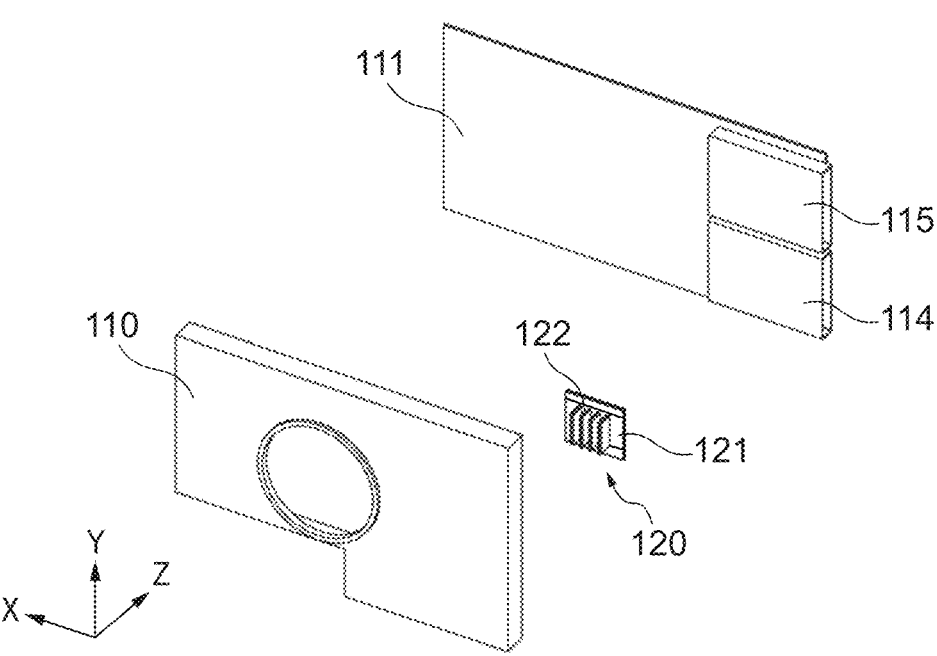
FIG. 4A and FIG. 4B are exploded perspective views that show a heat transfer configuration from a medium slot to an intake side duct.
Figure 4B:
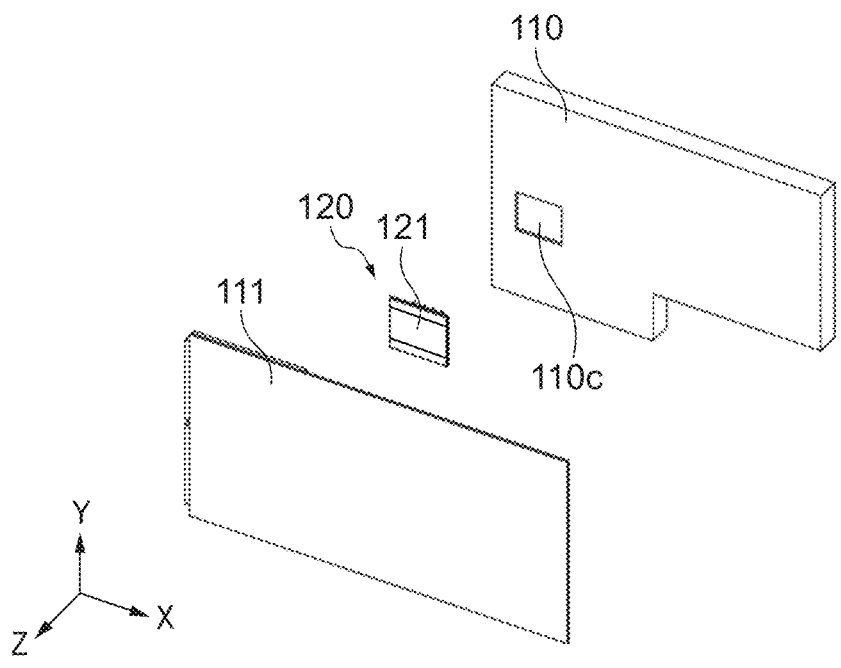

FIG. 4A and FIG. 4B are exploded perspective views that show a heat transfer configuration from the medium slot to the intake side duct 110. FIG. 4A is a rear exploded perspective view, and FIG. 4B is a front exploded perspective view.

The intake side duct 110 is disposed on the rear surface side (the −Z side) of the medium slot, and a heat transfer member 120 for transferring heat from the first medium slot 114 to the intake side duct 110 is attached to the rear surface of the first medium slot 114. In addition, on the front surface (the +Z side surface) of the intake side duct 110, a substantially rectangular opening 110*c* is provided at a position overlapping with the heat transfer member 120 when viewed from an optical axis direction (a position overlapping with the heat transfer member 120 on an optical axis projection plane).

Figure 5:
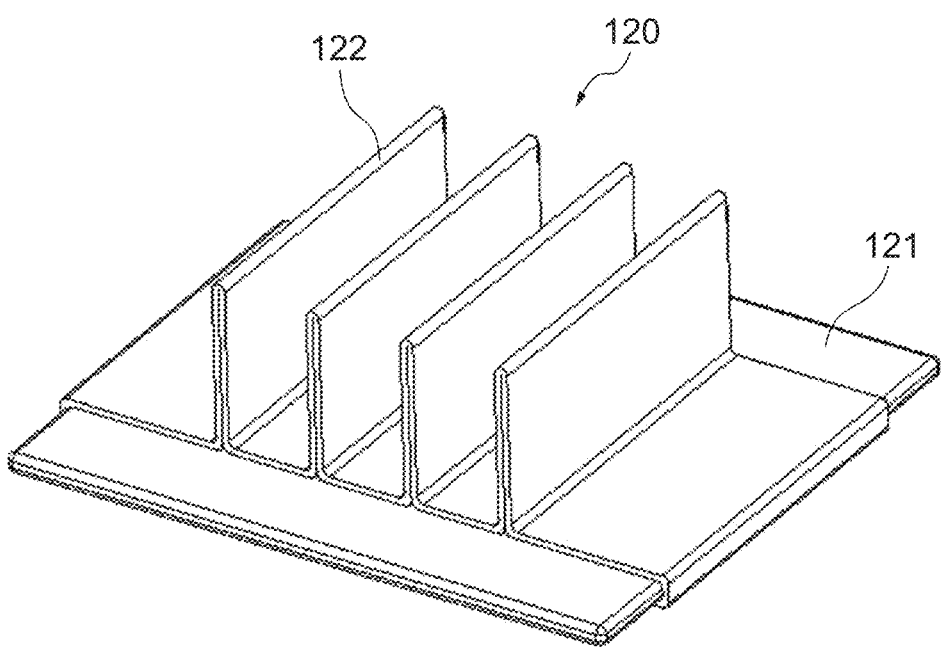
FIG. 5 is a perspective view of a heat dissipating member that performs heat transfer from the medium slot to the intake side duct.

FIG. 5 is a perspective view of the heat transfer member 120. The heat transfer member 120 includes a sheet-like base portion (a thin plate-like base portion) 121 and a plurality of fins 122 protruding from the base portion 121. For the base portion 121, for example, Poron (registered trademark), which is an elastic material, is used. For example, a graphite sheet is used for the plurality of fins 122. The graphite sheet is wrapped around the base portion 121, and is partially bent and overlapped to form the plurality of fins 122.

Figure 6A:
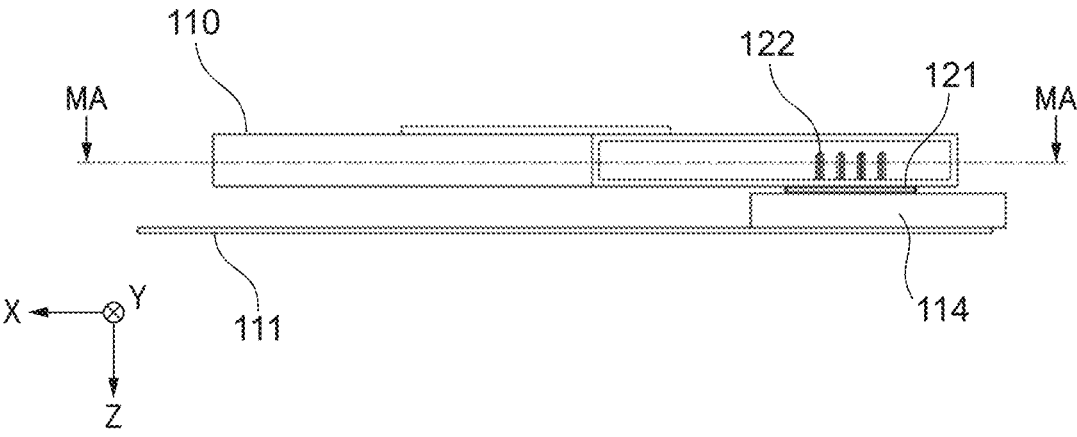
FIG. 6A is a bottom view that shows an assembled state of a first medium slot, the heat dissipating member, and the intake side duct.
Figure 6B:
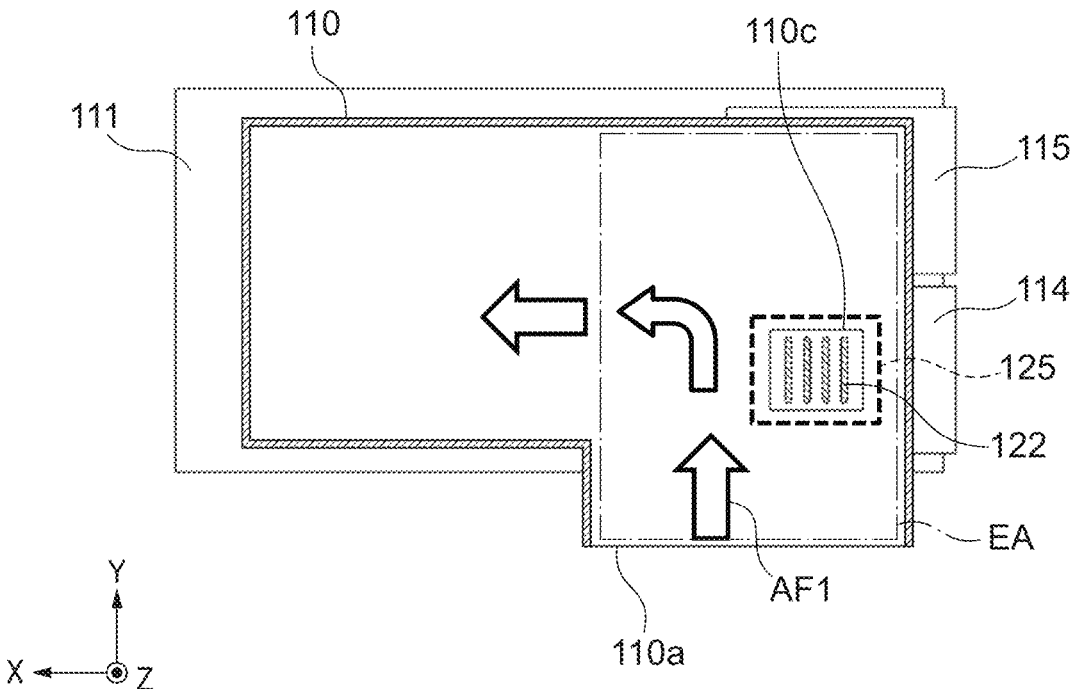
FIG. 6B is a cross-sectional view taken along arrows MA-MA shown in the bottom view of FIG. 6A.
Figure 7A:
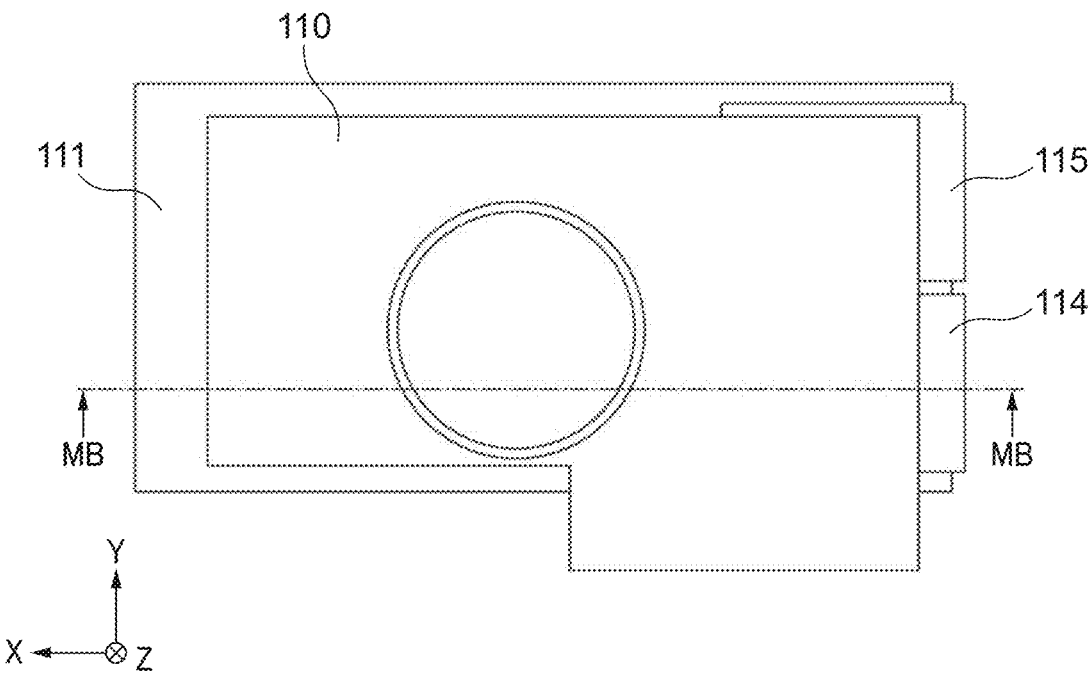
FIG. 7A is a front view that shows the assembled state of the first medium slot, the heat dissipating member, and the intake side duct.
Figure 7B:
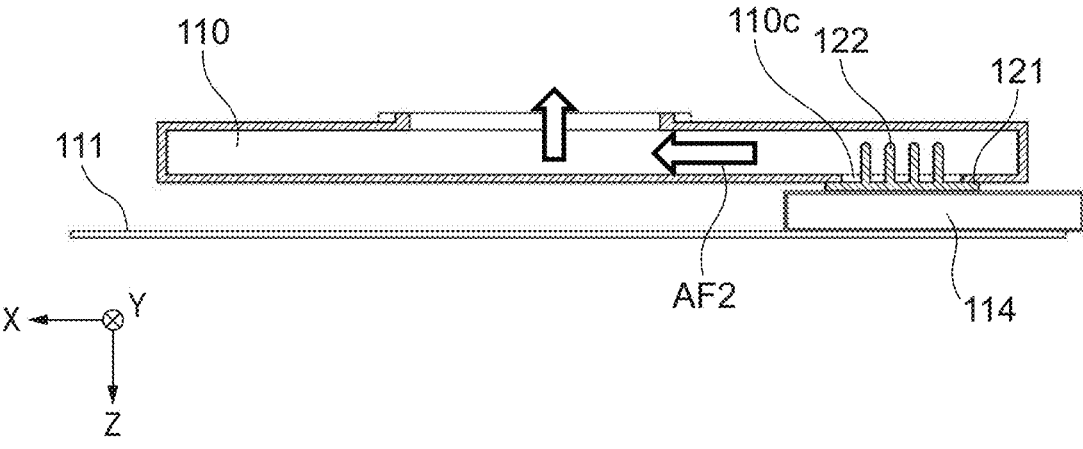
FIG. 7B is a cross-sectional view taken along arrows MB-MB shown in the front view of FIG. 7A.

FIG. 6A is a bottom view that shows an assembled state of the first medium slot 114, the heat transfer member 120, and the intake side duct 110. FIG. 6B is a cross-sectional view taken along arrows MA-MA shown in FIG. 6A. FIG. 7A is a front view that shows the assembled state of the first medium slot 114, the heat transfer member 120, and the intake side duct 110. FIG. 7B is a cross-sectional view taken along arrows MB-MB shown in FIG. 7A.

The surface of the heat transfer member 120 on which the plurality of fins 122 are not formed is bonded to the surface of the first medium slot 114, but is not limited to this, and may be pressure-welded to the surface of the first medium slot 114 when the control circuit board 111 and the cooling duct are assembled. The plurality of fins 122 of the heat transfer member 120 protrude toward the inside of the intake side duct 110 from the opening 110*c*.

Here, FIG. 6B shows a broken line frame indicating an outermost shape 125 of the heat transfer member 120 (the base portion 121), and the outermost shape 125 of the heat transfer member 120 includes the outer periphery of the opening 110*c* of the intake side duct 110. Therefore, the outer periphery portion of the surface of the base portion 121 of the heat transfer member 120 on which the plurality of fins 122 are formed is pressure-welded to the peripheral portion of the opening 110*c* on the surface of the intake side duct 110 on which the opening 110*c* is formed. That is, the outer periphery portion of the base portion 121 is compressed by being sandwiched between the first medium slot 114 and the intake side duct 110 in the Z direction, thereby closing the opening 110*c*.

Here, an elastic material is used for the base portion 121, and the graphite sheet surrounding the base portion 121 is thin (that is, the thickness of the graphite sheet is small). Therefore, as shown in FIG. 5, even in the case that a level difference occurs between the graphite sheet forming the plurality of fins 122 and the base portion 121, this level difference will be absorbed by the deformation of the base portion 121. As a result, there is no gap, which communicates with the opening 110*c*, between the heat transfer member 120 and the intake side duct 110. In other words, the opening 110*c* is airtightly closed, so that dirt and water droplets that have entered into the inside of the intake side duct 110 by the cooling fan 113 will not enter into the image pickup apparatus 102.

As described above, in the first embodiment, the first medium slot 114 and the intake side duct 110 are thermally connected to each other by the base portion 121 of the heat transfer member 120. In addition, by protruding the plurality of fins 122 into the inside of the intake side duct 110, it becomes possible to efficiently perform heat dissipation to the air flowing the inside of the intake side duct 110.

Here, as shown in FIG. 6B, a part of an area EA obtained by extending the intake side duct inlet 110*a* of the intake side duct 110 in the +Y direction in the intake side duct 110 overlaps with the medium slot on the optical axis projection plane. In addition, as shown by an arrow AF1 shown in FIG. 6B and an arrow AF2 shown in FIG. 7B, the air flows the inside of the intake side duct 110. Therefore, as shown in FIG. 6A, FIG. 6B, FIG. 7A, and FIG. 7B, the heat transfer member 120 is disposed so that within the area EA, the plurality of fins 122 are substantially parallel to the flow of the air (a direction in which the air flows). In this way, it becomes possible to efficiently perform heat transfer from the plurality of fins 122 to the air flowing through the intake side duct 110, thereby cooling the first medium slot 114.

It should be noted that in the first embodiment, only the configuration for cooling the first medium slot 114 has been shown, but a similar cooling configuration can be applied to the second medium slot 115 as well. In addition, one heat transfer member 120 may be disposed so as to straddle the first medium slot 114 and the second medium slot 115. In this case, there is a concern that the base portion 121 of the heat transfer member 120 has not been pressed against the intake side duct 110 near a gap between the first medium slot 114 and the second medium slot 115. In order to deal with this issue, for example, a countermeasure such as disposing a filler, which presses the base portion 121 against the intake side duct 110, in the gap formed between the first medium slot 114 and the second medium slot 115 may be taken. As a result, it is possible to prevent the air from leaking into the inside of the image pickup apparatus 102 from the opening 110c.

Figure 8A:
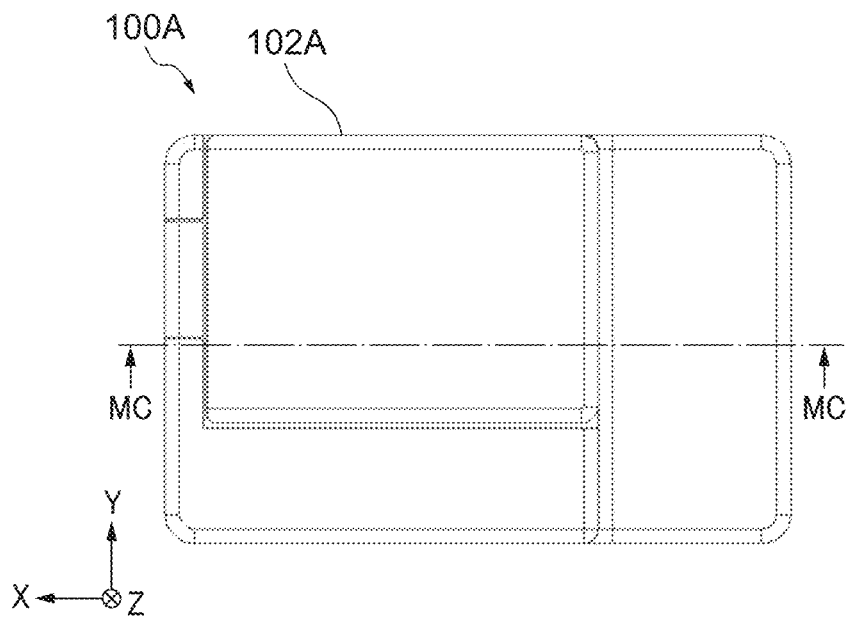
FIG. 8A is a rear view of an image pickup system according to a second embodiment.
Figure 8B:
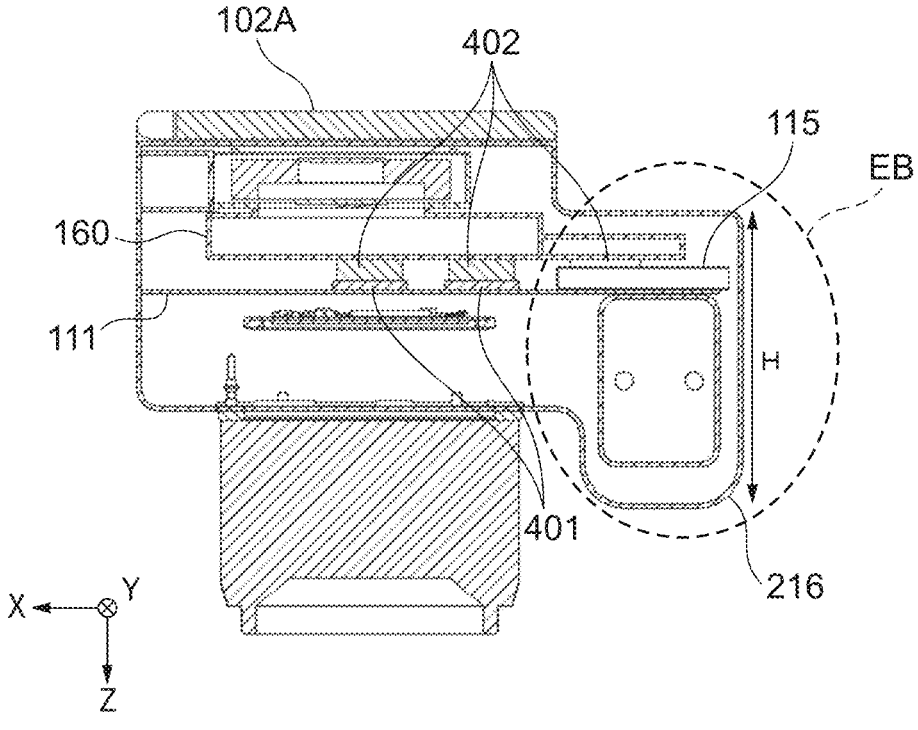
FIG. 8B is a cross-sectional view taken along arrows MC-MC shown in the rear view of FIG. 8A.
Figure 9A:
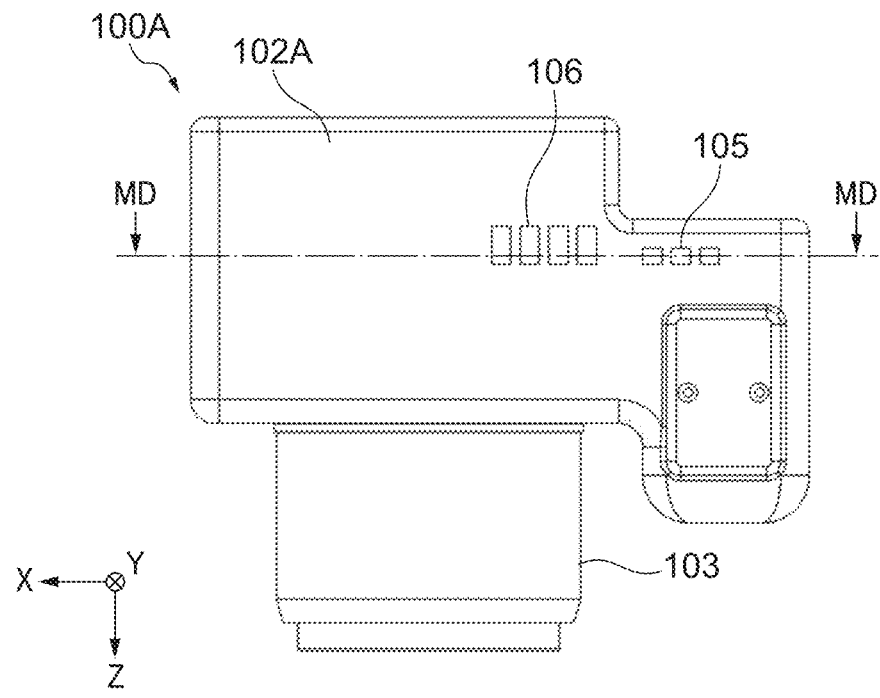
FIG. 9A is a bottom view of the image pickup system shown in FIG. 8A and FIG. 8B.
Figure 9B:
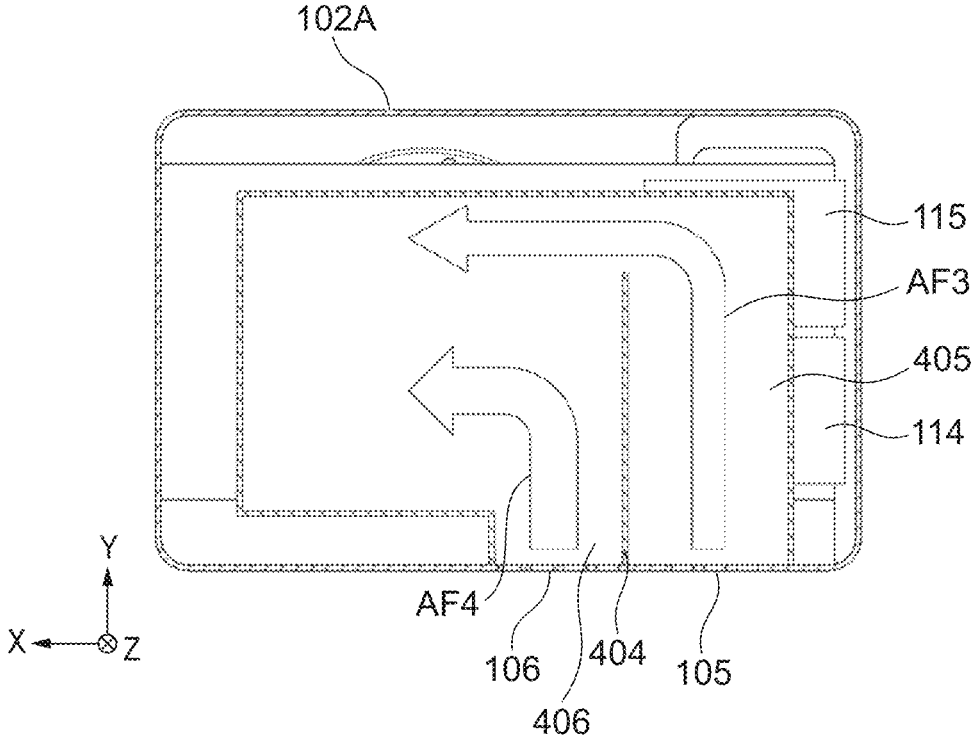
FIG. 9B is a cross-sectional view taken along arrows MD-MD shown in the bottom view of FIG. 9A.

Next, a second embodiment will be described. FIG. 8A is a rear view that schematically shows an image pickup system 100A according to the second embodiment. FIG. 8B is a cross-sectional view taken along arrows MC-MC shown in FIG. 8A. FIG. 9A is a bottom view of the image pickup system 100A. FIG. 9B is a cross-sectional view taken along arrows MD-MD shown in FIG. 9A.

The image pickup system 100A includes an image pickup apparatus 102A and the lens barrel 103 that is provided on (attached to) the front surface of the image pickup apparatus 102A. It should be noted that the external appearance configuration of the image pickup apparatus 102A is the same as the external appearance configuration of the image pickup apparatus 102 according to the first embodiment, and among the components of the image pickup apparatus 102A, the same components as those of the image pickup apparatus 102 are given the same reference numerals, and the description thereof will be omitted.

Similar to the first embodiment, the first medium slot 114 and the second medium slot 115 are mounted on the control circuit board 111. As shown in FIG. 8B, in the second embodiment, heat generating elements 401 serving as at least one or more heat sources are further mounted on the control circuit board 111. The heat generating elements 401 are, for example, elements with high power consumption, such as an image processing semiconductor chip (an image processing engine) and a micro processing unit (an MPU).

In place of the intake side duct 110 included in the image pickup system 100, the image pickup system 100A includes an intake side duct 160. The configuration of the intake side duct 160 is the same as the configuration of the intake side duct 110 except that the intake side duct 160 does not include the opening 110c and includes a dividing rib 404.

In the image pickup apparatus 102A, the first medium slot 114, the second medium slot 115, and the heat generating elements 401 are each in contact with the +Z side surface of the intake side duct 160 via one of heat transfer members 402. Each of the heat transfer members 402 is made of, for example, heat dissipating rubber, and has been compressed with a constant force in the Z direction.

Therefore, heat generated in the first medium slot 114, the second medium slot 115, and the heat generating elements 401 is transmitted to the outer wall surface of a wall portion on the +Z side of the intake side duct 160 via the heat transfer members 402, and thus the intake side duct 160 is warmed. Heat exchange is performed between the inner wall surface of the wall portion on the +Z side of the intake side duct 160 and the air flowing inside the intake side duct 160, and the warmed air is discharged to the outside of the image pickup system 100A. As a result, the first medium slot 114, the second medium slot 115, and the heat generating elements 401 are cooled, and temperature rise is suppressed.

The image pickup system 100A includes a gripping portion 216 that is a portion where a user grips the image pickup apparatus 102A, and in the image pickup system 100A, a part within an elliptical area EB indicated by a broken line in FIG. 8B becomes the gripping portion 216. Although not shown, on the top surface and the rear surface of the gripping portion 216, operation members such as various kinds of buttons and switches for performing various kinds of settings and image pickup operations of the image pickup system 100A are disposed. Therefore, a length in the optical axis direction (a length in the Z direction) H of the gripping portion 216 is determined in consideration of a balance between gripability and operability.

In the image pickup system 100A, as shown in FIG. 8B, by making a length in the optical axis direction of the portion included in the gripping portion 216 in the intake side duct 160 shorter than lengths in the optical axis direction of the other portions, an increase in the length in the optical axis direction H of the gripping portion 216 has been suppressed. Conversely, by increasing the lengths in the optical axis direction of the portions in the intake side duct 160 other than the gripping portion 216, it becomes possible to increase the amount of the air flowing through the intake side duct 160 and improve heat dissipation efficiency.

The flow of the air in the intake side duct 160 will be described in detail below. As shown in FIG. 9B, the flow path of the air (the outside air) flowing into the inside of the intake side duct 160 from the first intake port 105 and the second intake port 106 by the cooling fan 113 is divided by the dividing rib 404. Therefore, the air flowing in from the first intake port 105 and the air flowing in from the second intake port 106 flow through separate flow paths, then merge near the intake side duct outlet 110b and flow into the cooling fan 113. Thereafter, it passes through the exhaust side duct 112 and is discharged from the exhaust port 104.

At this time, as shown by an arrow AF3, the air flowing into the intake side duct 160 from the first intake port 105 flows through a medium cooling flow path 405 (a first flow path) formed by the dividing rib 404. As a result, the first medium slot 114 and the second medium slot 115, which are disposed in series along the flow of the air in the medium cooling flow path 405, are cooled. On the other hand, as shown by an arrow AF4, the air flowing into the intake side duct 160 from the second intake port 106 flows through an element cooling flow path 406 (a second flow path) formed by the dividing rib 404. As a result, the heat generating elements 401 are cooled. With such a configuration, it is possible to enhance the cooling efficiency of the first medium slot 114, the second medium slot 115, and the heat generating elements 401.

Generally, the power consumptions of the heat generating elements 401 such as the image processing semiconductor chip and the like are greater than the power consumptions of the recording medium housed in the first medium slot 114 and the recording medium housed in the second medium slot 115. Therefore, it is desirable to make an air flow rate of the element cooling flow path 406 larger than an air flow rate of the medium cooling flow path 405. In view of such a demand, in the image pickup system 100A, as shown in FIG. 9A, an opening area of the second intake port 106 is larger than an opening area of the first intake port 105. In addition, in the image pickup system 100A, as can be seen from FIG. 8B and FIG. 9B, the element cooling flow path 406 is provided in the portion in the intake side duct 160 whose length in the optical axis direction is long.

As described above, in the second embodiment, the air flow path for cooling the first medium slot 114 and the second medium slot 115 and the air flow path for cooling the heat generating elements 401 are separated. Thereby, it is possible to efficiently cool the recording medium and the heating element 401, respectively. In addition, the length in the optical axis direction in the intake side duct 160 of the gripping portion 216 is shorter than the length in the optical axis direction in the intake side duct 160 of the other portions. Thereby, it becomes possible to secure an appropriate air flow rate in each of the medium cooling flow path 405 and the element cooling flow path 406 while suppressing the increase in the length in the optical axis direction H of the gripping portion 216.

Figure 10A:
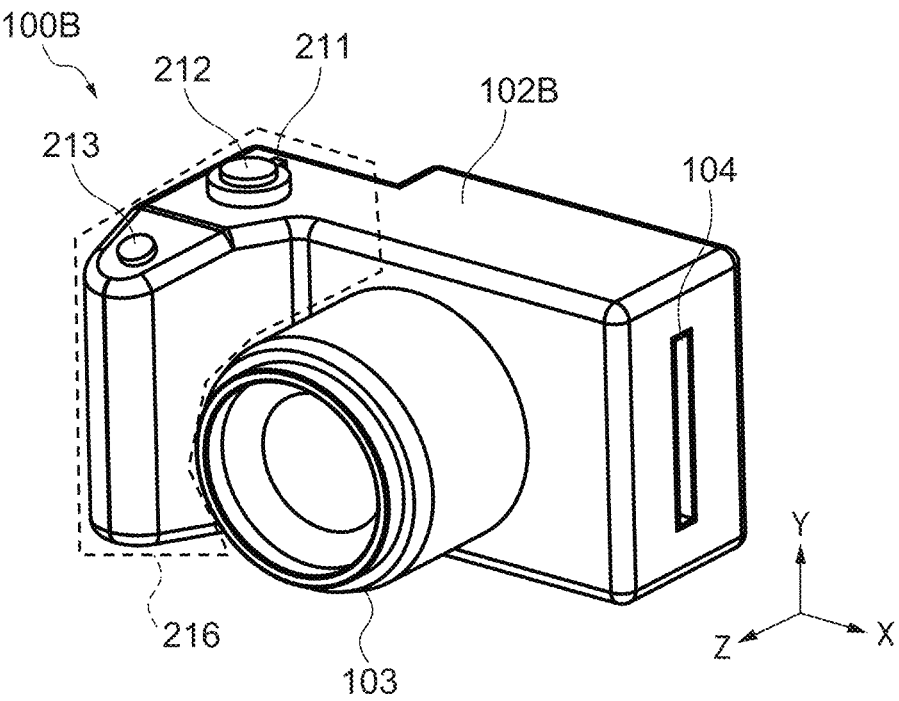
FIG. 10A and FIG. 10B are external appearance perspective views of an image pickup system according to a third embodiment.
Figure 10B:
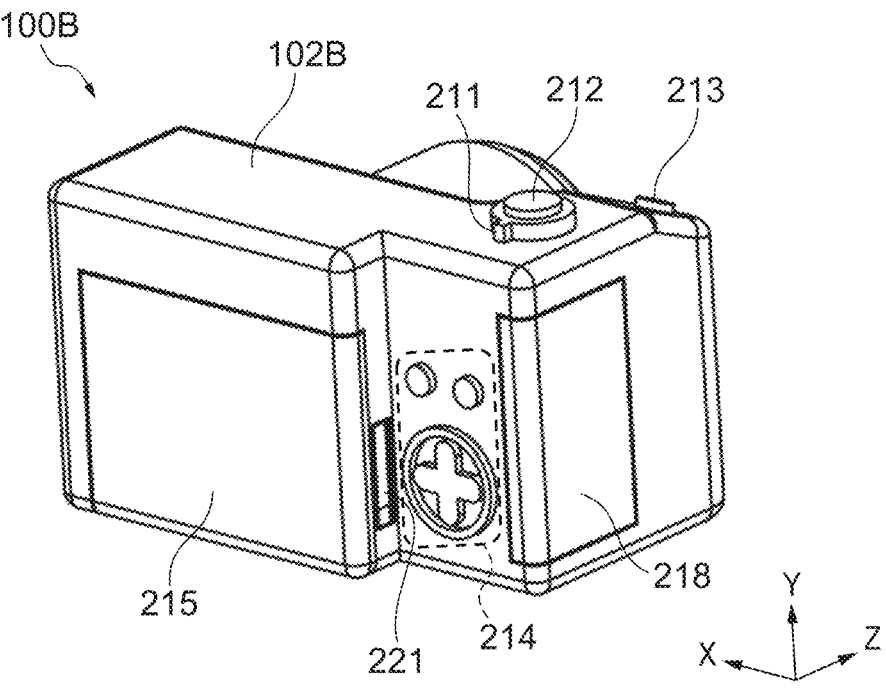

Next, a third embodiment will be described. FIG. 10A and FIG. 10B are external appearance perspective views of an image pickup system 100B according to the third embodiment. FIG. 10A is a front perspective view of the image pickup system 100B, and FIG. 10B is a rear perspective view of the image pickup system 100B. It should be noted that among the components of the image pickup system 100B, the same components as those of the image pickup system 100 are given the same reference numerals, and the description thereof will be omitted.

The image pickup system 100B includes an image pickup apparatus 102B and the lens barrel 103 that is provided on (attached to) the front surface of the image pickup apparatus 102B. A power switch 211 that switches turning on/off the power of the image pickup apparatus 102B, a mode dial 212 that switches between a still image recording mode and a moving image recording mode, and a button 213 that starts/stops still image photographing or moving image photographing are provided on the top surface of the image pickup apparatus 102B.

A display device 215 such as a liquid crystal display panel that performs the display of settings and the status of the image pickup apparatus 102B, live view display, photographed image display, and the like, and a plurality of operation members 214 that perform the settings and photographing operations of the image pickup apparatus 102B are provided on the rear surface of the image pickup apparatus 102B. In addition, the exhaust port 104 is provided on the right side surface of the image pickup apparatus 102B. The gripping portion 216 is provided on the left side of the image pickup apparatus 102B, and the gripping portion 216 is provided with an intake port 221 and a card lid 218. The card lid 218 is a movable member that is capable of shifting between an open position in which the recording medium insertion port 107 (see FIG. 11) is exposed to the outside and a closed position in which the recording medium insertion port 107 is covered.

Figure 11:
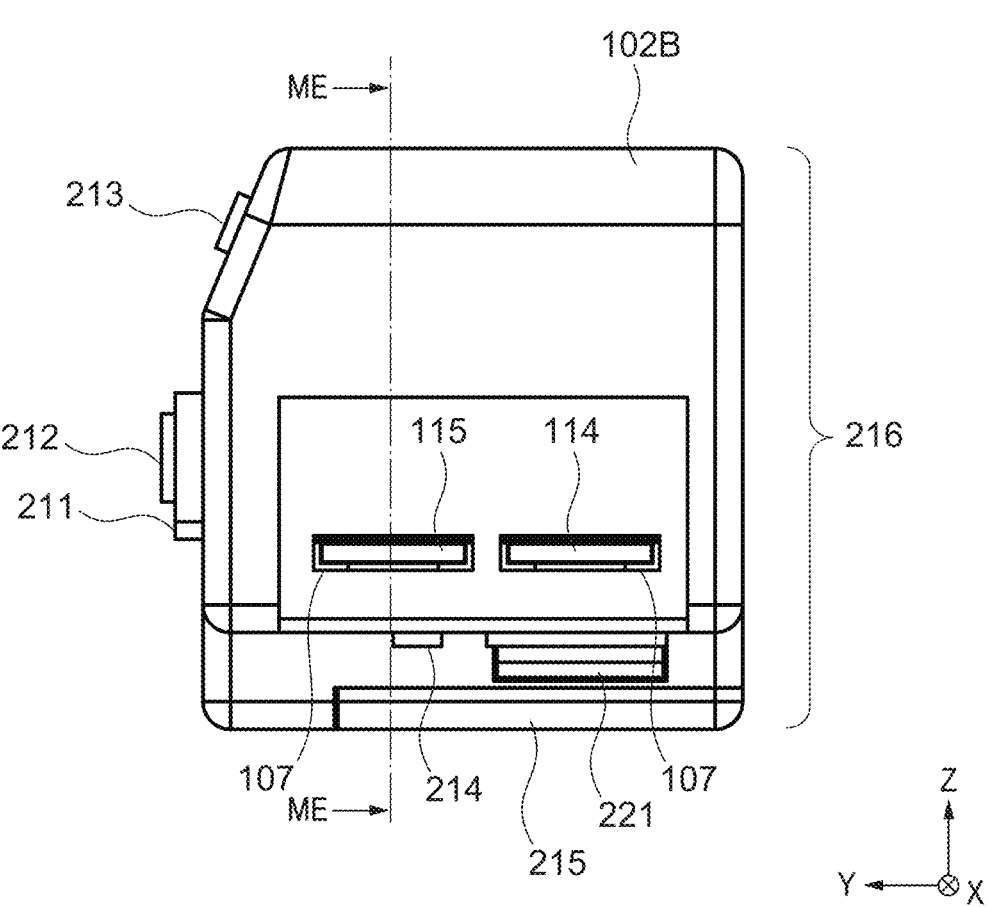
FIG. 11 is a left side view of an image pickup apparatus that constitutes the image pickup system shown in FIG. 10A and FIG. 10B.

FIG. 11 is a left side view of the image pickup apparatus 102B. In FIG. 11, the card lid 218 is not shown, and thus a state, in which the two recording medium insertion ports 107 that are covered by the card lid 218 during normal use of the image pickup system 100B are exposed, is shown. The recording medium insertion port 107 is an opening for inserting and removing a recording medium 234 (see FIG. 12B) into and from each of the first medium slot 114 and the second medium slot 115. The first medium slot 114 and the second medium slot 115 are disposed side by side in the Y direction, which is a height direction of the image pickup apparatus 102B, in the gripping portion 216. By opening the card lid 218, the user is able to insert and remove the recording medium 234 (see FIG. 12B) into and from each of the first medium slot 114 and the second medium slot 115 through the recording medium insertion port 107. The recording medium 234 is, for example, a semiconductor memory card or the like.

Figure 12A:
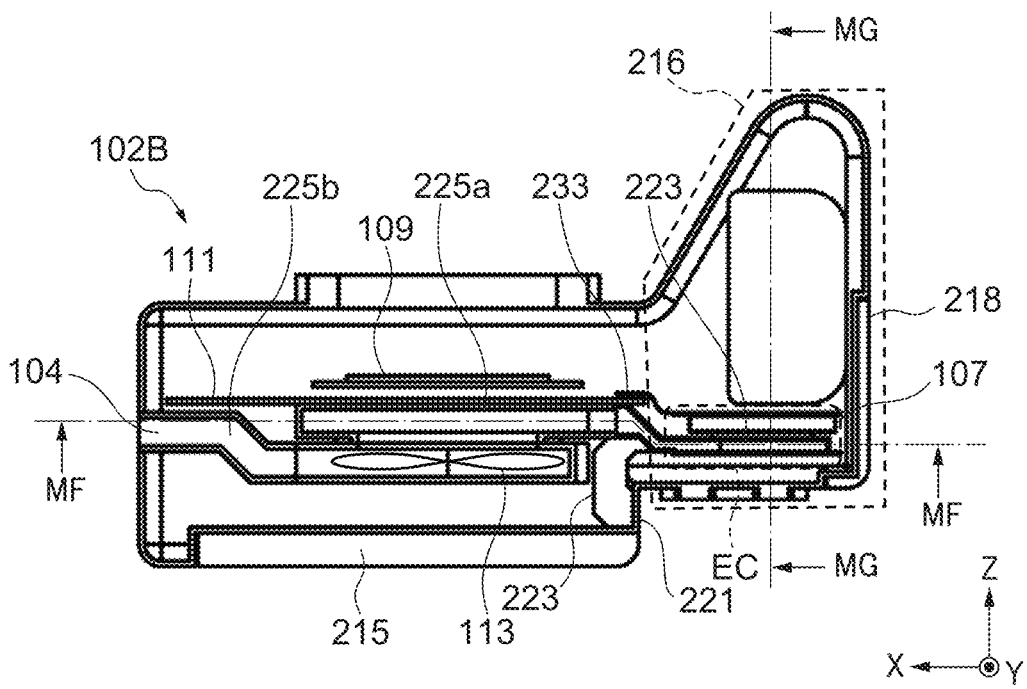
FIG. 12A and FIG. 12B are cross-sectional views that show a structure of a heat dissipating duct included in the image pickup apparatus shown in FIG. 11.
Figure 12B:
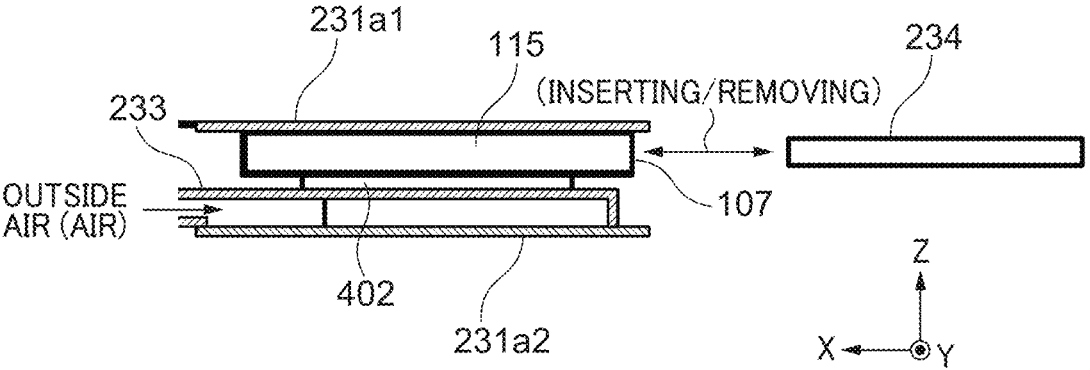

FIG. 12A and FIG. 12B are views that show a configuration of a cooling duct provided inside the image pickup apparatus 102B. FIG. 12A is a cross-sectional view taken along arrows ME-ME shown in FIG. 11, and FIG. 12B is an enlarged view of an area EC indicated by a broken line shown in FIG. 12A.

The image pickup device 109, the control circuit board 111, a medium board 231, and the cooling duct are disposed inside the image pickup apparatus 102B. The cooling duct in the third embodiment includes an intake side duct 223, an intermediate duct 225a, the cooling fan 113, and an exhaust side duct 225b.

The control circuit board 111 and the medium board 231 are electrically connected to each other by a connecting connector 233. A rigid-flexible printed circuit board (a rigid FPC) is used for the medium board 231, and the first medium slot 114 and the second medium slot 115 are mounted on a rigid portion (a rigid portion 231a1, which will be described below) of the rigid FPC. It should be noted that the medium board 231 may be integrated with the control circuit board 111.

In the image pickup apparatus 102B, a heat exchange portion for cooling the recording medium 234 housed in the first medium slot 114 and the recording medium 234 housed in the second medium slot 115 is formed in the area EC.

As shown in FIG. 12A, one end of the intake side duct 223 is airtightly connected to the intake port 221. As shown in FIG. 12B, the wall surface on the +Z side of the intake side duct 223 and the second medium slot 115 are thermally connected to each other via the heat transfer member 402. For example, heat dissipating rubber is used for the heat transfer member 402. It should be noted that a wall on the −Z side of the intake side duct 223 is formed by a rigid portion 231a2 that constitutes the medium board 231. In addition, although not shown in FIG. 12A and FIG. 12B, the first medium slot 114 is also thermally connected to the wall surface on the +Z side of the intake side duct 223 via the heat transfer member 402.

Heat generated by the recording medium housed in the first medium slot 114 and the recording medium housed in the second medium slot 115 is transferred to the intake side duct 223 via the heat transfer members 402. The heat transferred to the intake side duct 223 is further transferred to the air flowing through the intake side duct 223, thereby cooling the recording medium, and as a result, temperature rise is suppressed.

Figure 13:
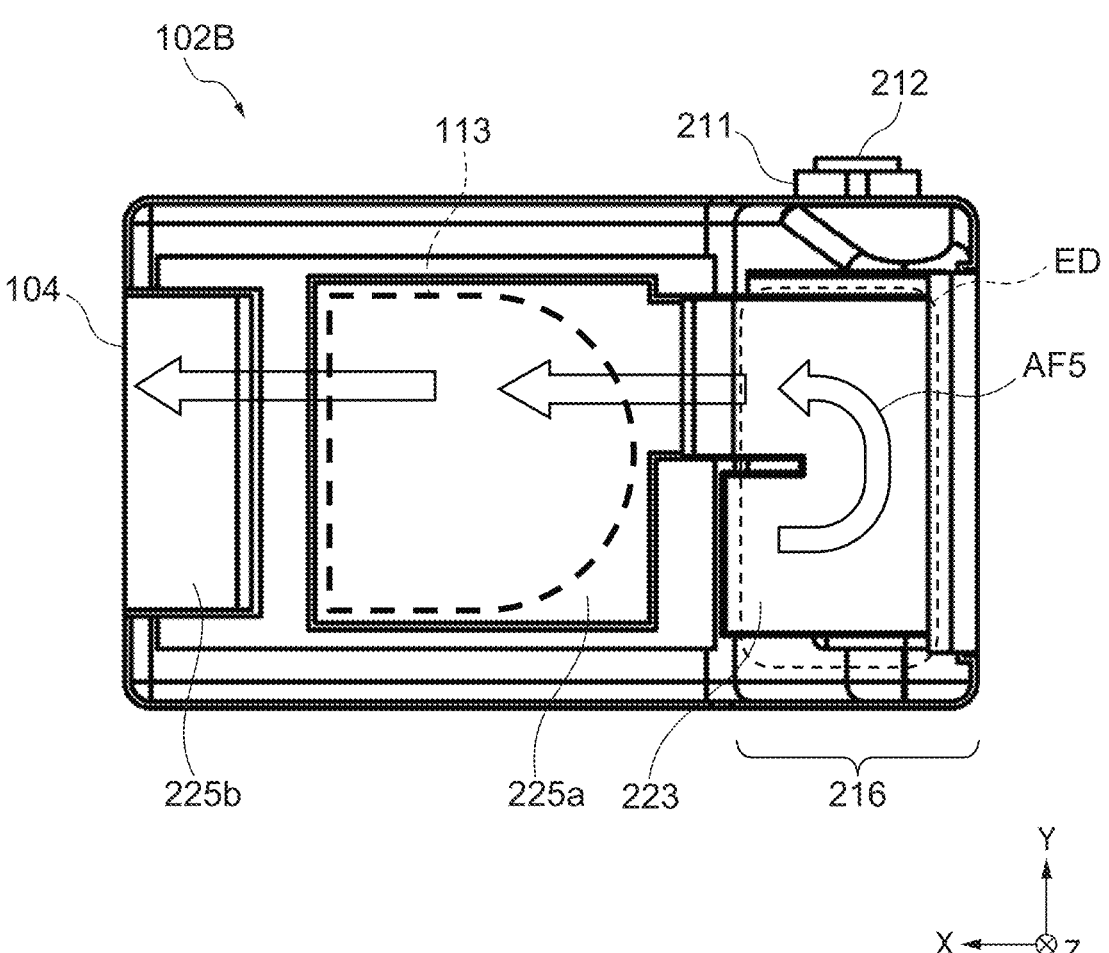
FIG. 13 is a cross-sectional view taken along arrows MF-MF shown in FIG. 12A.

Here, the flow of the air in the intake side duct 223 will be described. FIG. 13 is a cross-sectional view taken along arrows MF-MF shown in FIG. 12A. The intake side duct 223 is made of (formed by), for example, a metal material with good thermal conductivity such as magnesium except for the portion formed by the rigid portion 231a2 (see FIG. 12B).

The outside air flowing into the intake side duct 223 from the intake port 221 flows in the −X direction and then in the +Y direction. At this time, the intake side duct 223 is formed into a substantially U-shape on the optical axis direction projection plane so that as indicated by an arrow AF5, the air flows through an area ED overlapping with the first medium slot 114 and the second medium slot 115 on the projection plane viewed from the optical axis direction (the Z direction). In addition, as described above, the first medium slot 114 and the second medium slot 115 are each in thermally contact with the wall on the +Z side of the intake side duct 223 via the heat transfer member 402. Therefore, the air flowing in from the intake port 221 flows as shown by the arrow AF5 so as to make a U-turn inside the intake side duct 223, and at that time, after performing heat exchange with respect to the first medium slot 114, heat exchange is performed with respect to the second medium slot 115. In this way, it becomes possible to cool the first medium slot 114 and the second medium slot 115 with one airflow.

An opening on the downstream side of the intake side duct 223 is connected to an intake side opening of the intermediate duct 225a having a flat plate shape, and the air flow path from the intake side duct 223 to the intermediate duct 225a is formed substantially parallel to the X direction. The cooling fan 113 is attached to the intermediate duct 225a, an intake side opening of the exhaust side duct 225b is airtightly connected to an exhaust port of the cooling fan 113, and an exhaust side opening of the exhaust side duct 225b is airtightly connected to the exhaust port 104. Therefore, when the cooling fan 113 is driven, the air flows in the order of the intake side duct 223, the intermediate duct 225a, the cooling fan 113, and the exhaust side duct 225b, and the first medium slot 114 and the second medium slot 115 are forcibly air-cooled.

It should be noted that the arrangement of the intake side duct 223 (the cooling duct) has the following first and second restrictions. The first restriction is that the first medium slot 114 and the second medium slot 115 are provided near the exterior on the −Z side of the image pickup apparatus 102B so that the recording medium 234 can be easily inserted and removed when the card lid 218 is opened. The second restriction is that it is necessary to dispose a board, on which the operation members 214 are mounted, on the gripping portion 216 on the rear surface of the image pickup apparatus 102B.

In response to such restrictions, in the second embodiment, by constituting the wall on the −Z side of the intake side duct 223 with the medium board 231, the operation members 214 can be mounted while suppressing the thickness in the optical axis direction of the intake side duct 223. In addition, by forming the intake side duct 223 into a substantially U-shape on the optical axis direction projection plane, it is possible to cool the first medium slot 114 and the second medium slot 115.

Figures 14A, 14B:
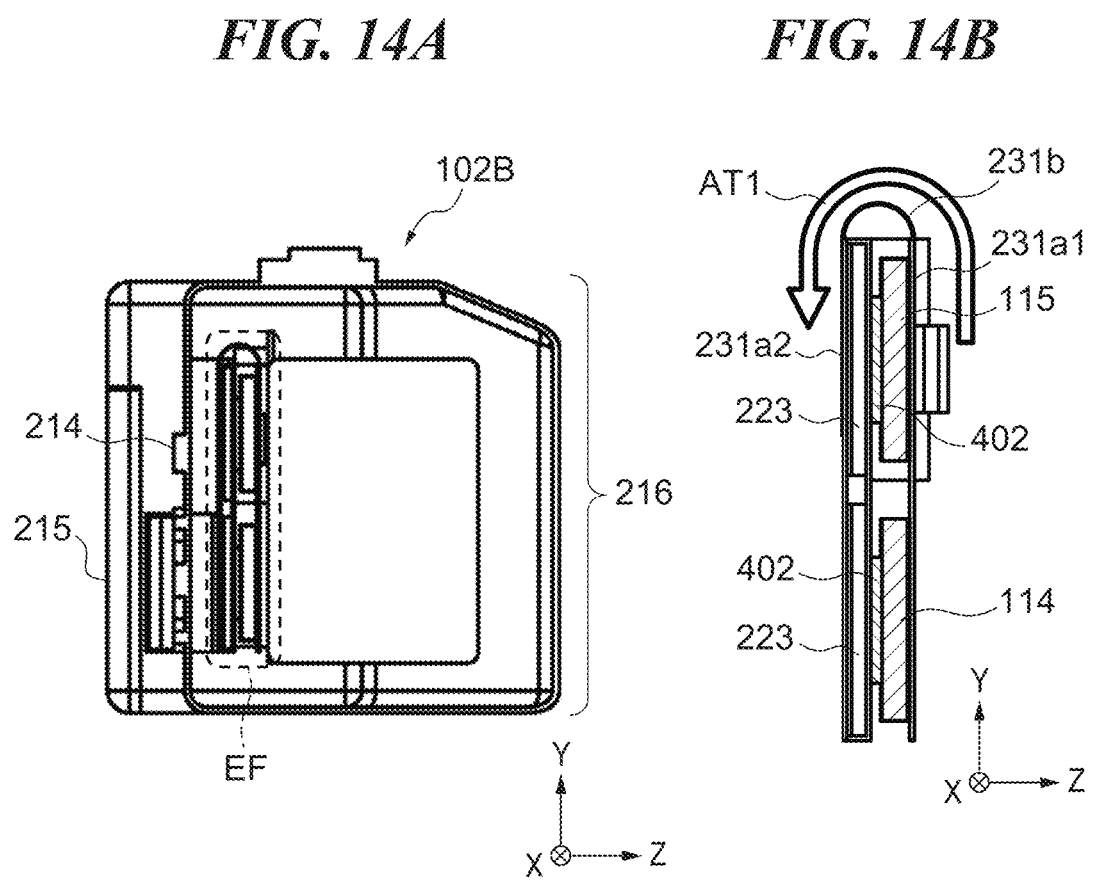

Next, features of the medium board 231 for enhancing the cooling efficiency of the first medium slot 114 and the second medium slot 115 will be described. FIG. 14A is a cross-sectional view taken along arrows MG-MG shown in FIG. 12A, and FIG. 14B is an enlarged view of an area EF shown in FIG. 14A.

Figure 14C:
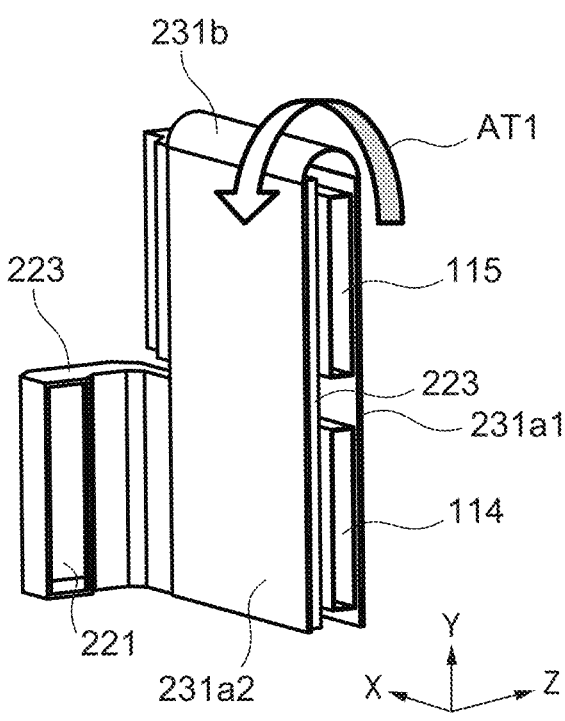
FIG. 14C is a perspective view of the area EF.

The area EF shown in FIG. 14A corresponds to the area EC shown in FIG. 12A, and shows the heat exchange portion for cooling the first medium slot 114 and the second medium slot 115. FIG. 14C is a perspective view that shows the arrangement of the members constituting the heat exchange portion within the area EF.

As described above, the rigid FPC is used for the medium board 231, and the medium board 231 includes the rigid portion 231a1, the rigid portion 231a2, and a flexible portion 231b that connects the rigid portion 231al and the rigid portion 231a2. The rigid portion 231al and the rigid portion 231a2 have the same rigidity as the printed circuit board.

The first medium slot 114 and the second medium slot 115 are mounted on one surface of the rigid portion 231a1. The rigid portion 231a2 forms a part of the wall of the intake side duct 223 (see FIG. 12B). The flexible portion 231b has flexibility, and has a curved shape bent approximately 180 degrees into a U-shape so that the rigid portion 231al and the rigid portion 231a2 are disposed opposite to each other in the optical axis direction.

Heat transfer from the first medium slot 114 and the second medium slot 115 to the intake side duct 223 is almost performed via two heat transfer paths.

As described above, the first heat transfer path is a heat transfer path from the first medium slot 114 and the second medium slot 115 to the intake side duct 223 via the heat transfer members 402, and since the first heat transfer path has already been described, the description here will be omitted.

The second heat transfer path is a heat transfer path via a copper pattern provided on the medium board 231. The heat generated by the recording medium 234 is transferred to the medium board 231 on which the first medium slot 114 and the second medium slot 115 are mounted. In the medium board 231, as indicated by an arrow AT1 shown in FIG. 14B, the heat is transmitted through the copper pattern in the order of the rigid portion 231a1, the flexible portion 231b, and the rigid portion 231a2. Since the rigid portion 231a2 constitutes the wall surface of the intake side duct 223, heat exchange is performed between the rigid portion 231a2, and the air flowing through the intake side duct 223 from the rigid portion 231a2.

In this way, in the image pickup apparatus 102B, the heat transfer is performed from the surface on the −Z side of the first medium slot 114 and the surface on the −Z side of the second medium slot 115 to the intake side duct 223 via the heat transfer members 402. In addition, the heat transfer is performed from the surface on the +Z side of the first medium slot 114 and the surface on the +Z side of the second medium slot 115 to the intake side duct 223 via the rigid portion 231a1, the flexible portion 231b, and the rigid portion 231a2. In this way, by efficiently performing the heat transfer from the first medium slot 114 and the second medium slot 115 to the intake side duct 223, it becomes possible to exhaust the heat to the air flowing through the intake side duct 223.

It should be noted that from the viewpoint of enhancing the heat transfer efficiency in the second heat transfer path, it is preferable that a continuous copper pattern is provided (formed) in areas other than circuits of the rigid portion 231al and the flexible portion 231b. In this case, by forming the copper pattern from the surface on the −Z side of the rigid portion 231al through the flexible portion 231b to the surface on the +Z side of the rigid portion 231a2, it becomes possible to efficiently perform the heat exchange between the rigid portion 231a2 and the air flowing through the intake side duct 223. In addition, a plurality of fins for heat dissipation (not shown) or the like may be disposed on the surface on the +Z side of the rigid portion 231a2, that is, on the surface forming the inner wall of the intake side duct 223. As a result, it becomes possible to more efficiently perform the heat exchange between the rigid portion 231a2 and the air flowing through the intake side duct 223.

By the way, in order to convert the operations of the operation members 214 into electrical signals, a board on which switches are mounted inside the operation members 214 is required. As described above, by mounting the switches of the operation members 214 on the rigid portion 231a2 of the medium board 231 and forming one side surface of the intake side duct 223, it becomes possible to shorten the length in the optical axis direction of the gripping portion 216.

Figure 15:
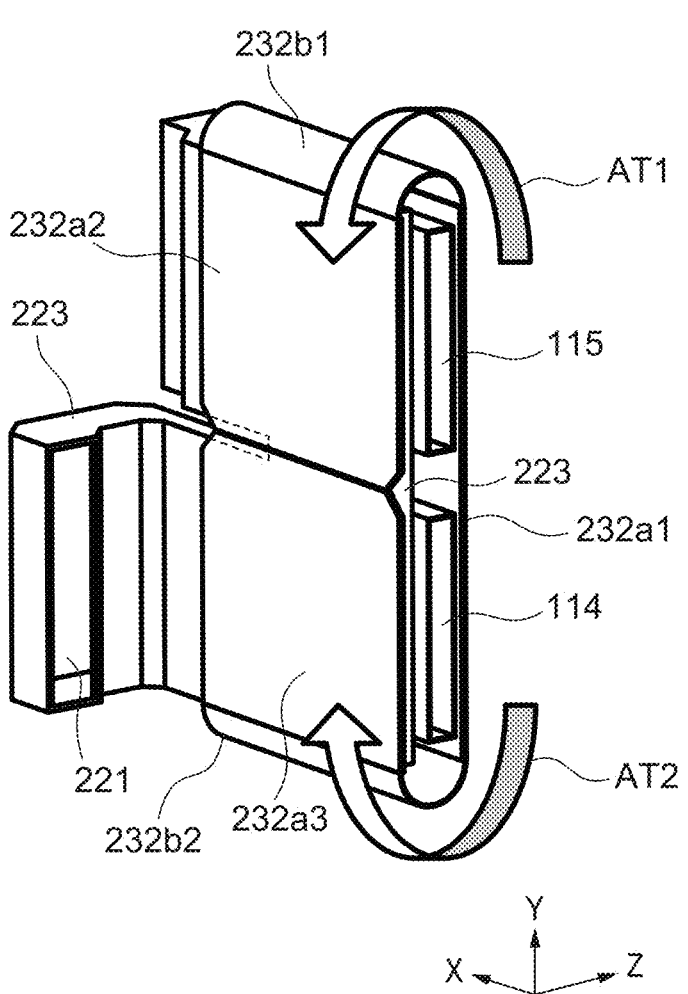
FIG. 15 is a perspective view that illustrates a configuration of a modification of a medium board, and heat transfer paths.

Next, a modification of the structure of the area EF (see FIG. 14A, FIG. 14B, and FIG. 14C), that is, a modification of the heat exchange portion will be described. FIG. 15 is a perspective view that illustrates a configuration of a medium board 232, which is a modification of the medium board 231, and heat transfer paths from the medium board 232.

The medium board 232 includes a rigid portion 232*a*1, a rigid portion 232*a*2, a rigid portion 232*a*3, a flexible portion 232*b*1, and a flexible portion 232*b*2. The first medium slot 114 and the second medium slot 115 are mounted on the rigid portion 232*a*1. The rigid portion 232*a*2 and the rigid portion 232*a*3 constitute the wall on the −Z side of the intake side duct 223 in a state where they are airtightly connected to each other in the Y direction. The flexible portion 232*b*1 connects the rigid portion 232*al* and the rigid portion 232*a*2 in a substantially U-shaped curved state on the +Y side of the rigid portion 232*al* and the +Y side of the rigid portion 232*a*2. Similarly, the flexible portion 232*b*2 connects the rigid portion 232*al* and the rigid portion 232*a*3 in a substantially U-shaped curved state on the −Y side of the rigid portion 232*al* and the −Y side of the rigid portion 232*a*3.

Heat transfer from the first medium slot 114 and the second medium slot 115 to the intake side duct 223 via the heat transfer members 402 is performed through the first heat transfer path that has been described with reference to FIG. 14A, FIG. 14B, and FIG. 14C. In addition, similar to the medium board 231, it is preferable that a copper pattern (not shown) is disposed (formed) in areas other than circuits of the rigid portion 232*a*1, the rigid portion 232*a*2, the rigid portion 232*a*3, the flexible portion 232*b*1, and the flexible portion 232*b*2.

As shown in FIG. 15, with the above configuration, the medium board 232 has a heat transfer path indicated by an arrow AT2 in addition to a heat transfer path indicated by an arrow AT1 corresponding to the second heat transfer path of the medium board 231. Therefore, in the case of using the medium board 232, compared to the case of using the medium board 231, in particular, it becomes possible to more effectively perform dissipating the heat generated by the first medium slot 114 to the intake side duct 223.

As described above, in the third embodiment, the heat dissipation is performed from the first medium slot 114 and the second medium slot 115, which are mounted on the medium board 231 or the medium board 232, to the intake side duct 223 via the heat transfer members 402. In addition, as each of the medium board 231 and the medium board 232, the rigid FPC having a plurality of rigid portions and at least one flexible portion is used, and by forming the wall of the intake side duct 223 with the rigid portions, the heat dissipation is performed from the rigid portions to the intake side duct 223 via the flexible portion. With such a configuration, it becomes possible to efficiently perform the heat dissipation from the first medium slot 114 and the second medium slot 115 to the intake side duct 223.

It should be noted that in the above description, the configuration of the image pickup apparatus main body including two medium slots has been described, but the number of the medium slots may be one or three or more. In the case that the number of the medium slots is three or more, a flow path may be formed so that the air flows sequentially through areas where the three medium slots are thermally connected to each other in the intake side duct 223.

Figure 16:
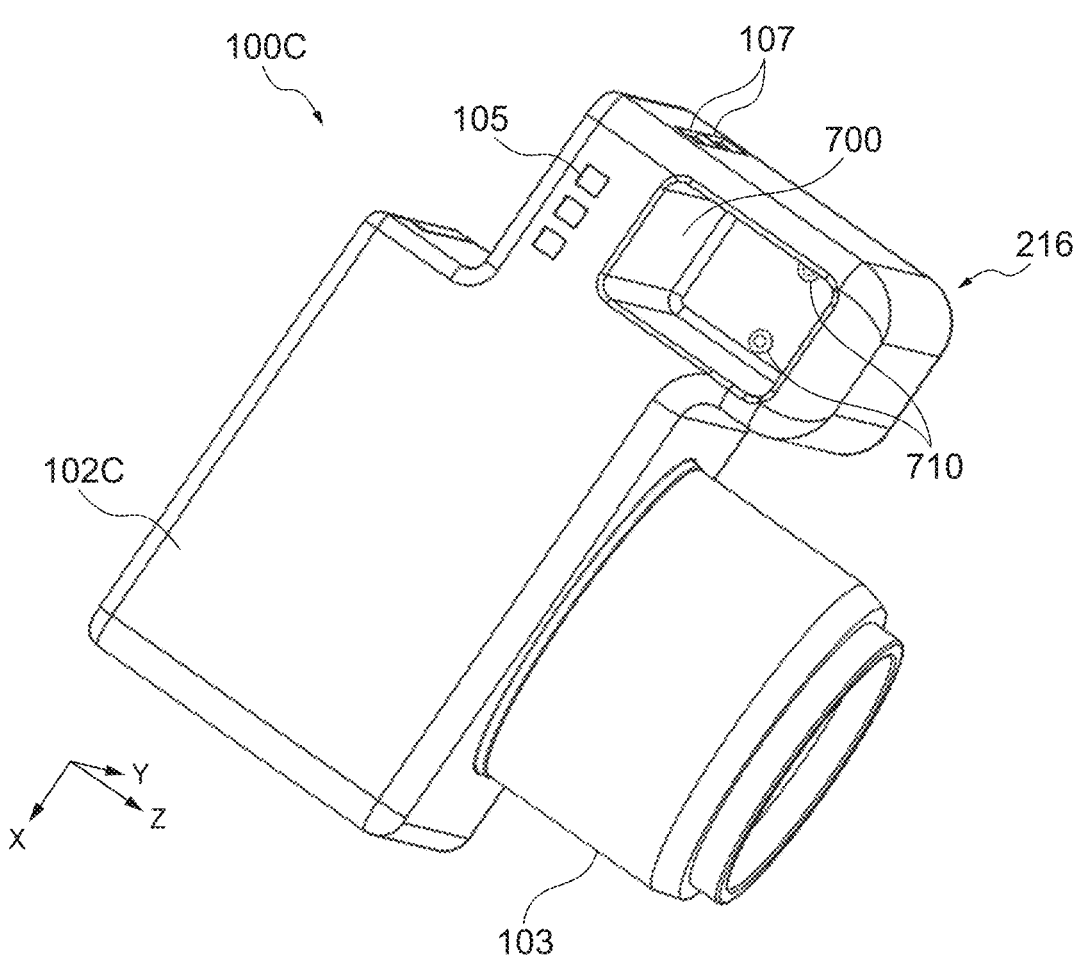
FIG. 16 is an external appearance perspective view of an image pickup apparatus according to a fourth embodiment when viewed from the bottom surface side.

Next, a fourth embodiment will be described. In the fourth embodiment, a configuration in which a battery housing portion is used to cool the medium slot will be described. FIG. 16 is an external appearance perspective view of an image pickup system 100C when viewed from the bottom surface side. It should be noted that the image pickup system 100C includes an image pickup apparatus 102C, the lens barrel 103, and an external cooling module 600. The image pickup apparatus 102C is different from the image pickup apparatus 102, which has been described in the first embodiment, in that the image pickup apparatus 102C does not include the second intake port 106, but the other components are the same as the image pickup apparatus 102.

A battery housing portion 700 is provided in the gripping portion 216 of the image pickup system 100C. The battery housing portion 700 houses a battery (not shown). It should be noted that the battery housing portion 700 is provided with a battery lip (not shown) that is attachable and detachable, but the illustration of the battery lip is omitted in FIG. 16.

The battery housing portion 700 is provided with electrical contacts 710. In a state where the battery (not shown) is housed in the battery housing portion 700, by a terminal of the battery contacting the electrical contacts 710, the power is supplied from the battery to the image pickup system 100C.

The first medium slot 114 and the second medium slot 115 are disposed adjacent to the battery housing portion 700 in the inside of the gripping portion 216 of the image pickup apparatus 102C. Similar to the first embodiment, the user is able to insert and remove a recording medium (not shown) through the recording medium insertion port 107 provided on the left side surface of the image pickup apparatus 102C.

Figure 17A:
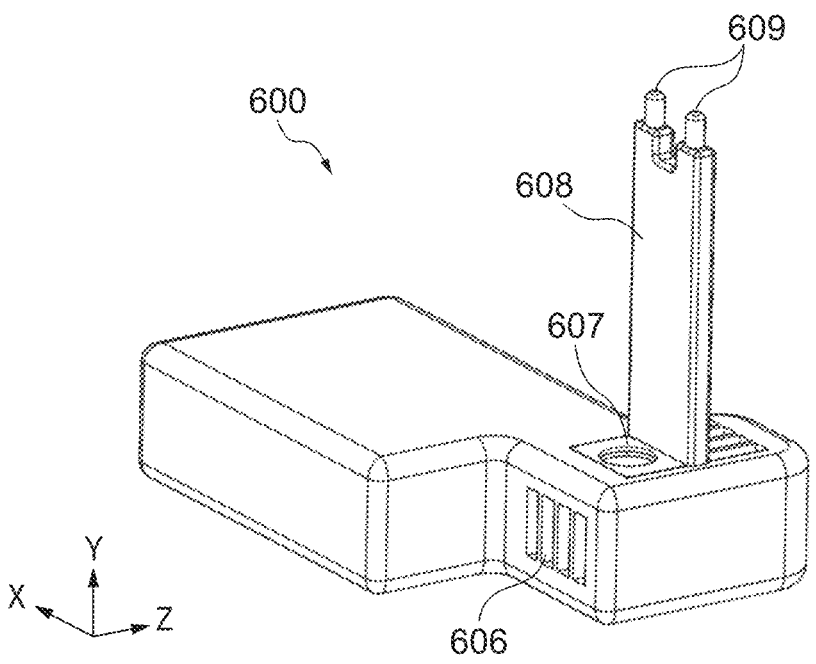
FIG. 17A and FIG. 17B are external appearance perspective views of a cooling module that can be attached to and detached from the image pickup apparatus shown in FIG. 16.
Figure 17B:
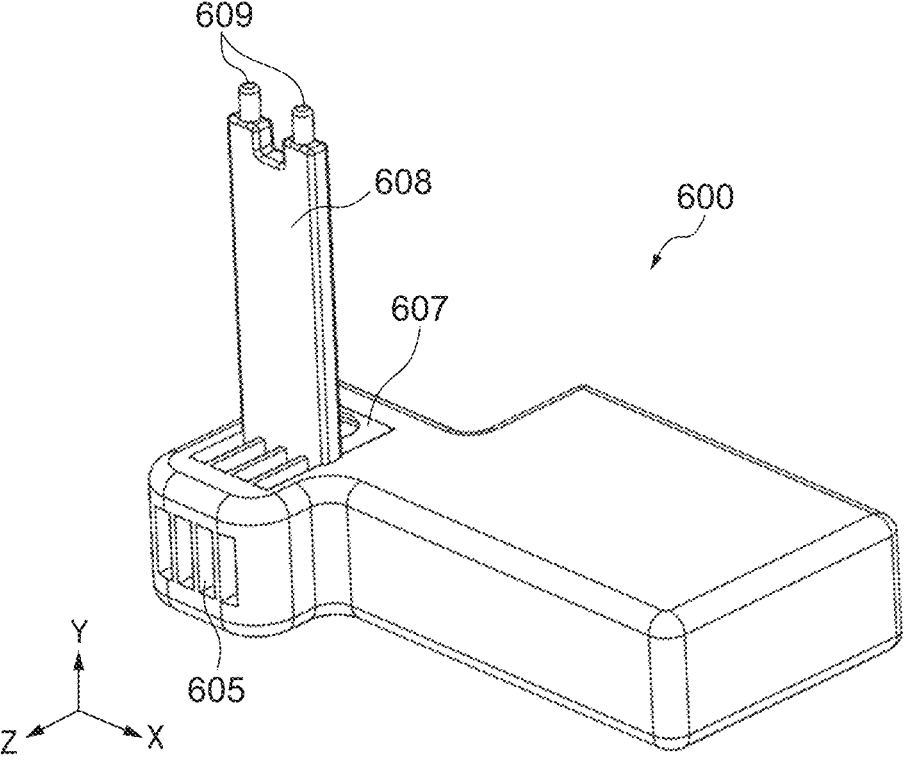

FIG. 17A and FIG. 17B are external appearance perspective views of the external cooling module 600 (hereinafter, simply referred to as "a cooling module 600") that can be attached to and detached from the image pickup apparatus 102C. FIG. 17A is a rear perspective view of the cooling module 600, and FIG. 17B is a front perspective view of the cooling module 600.

The cooling module 600 includes an intake port 606, an exhaust port 605, a cooling fan 607, a partition plate 608, and electrical contacts 609. In addition, a battery (not shown) is attached to the cooling module 600, so that it becomes possible to supply power from the electrical contacts 609 to the image pickup apparatus 102C.

Figure 18A:
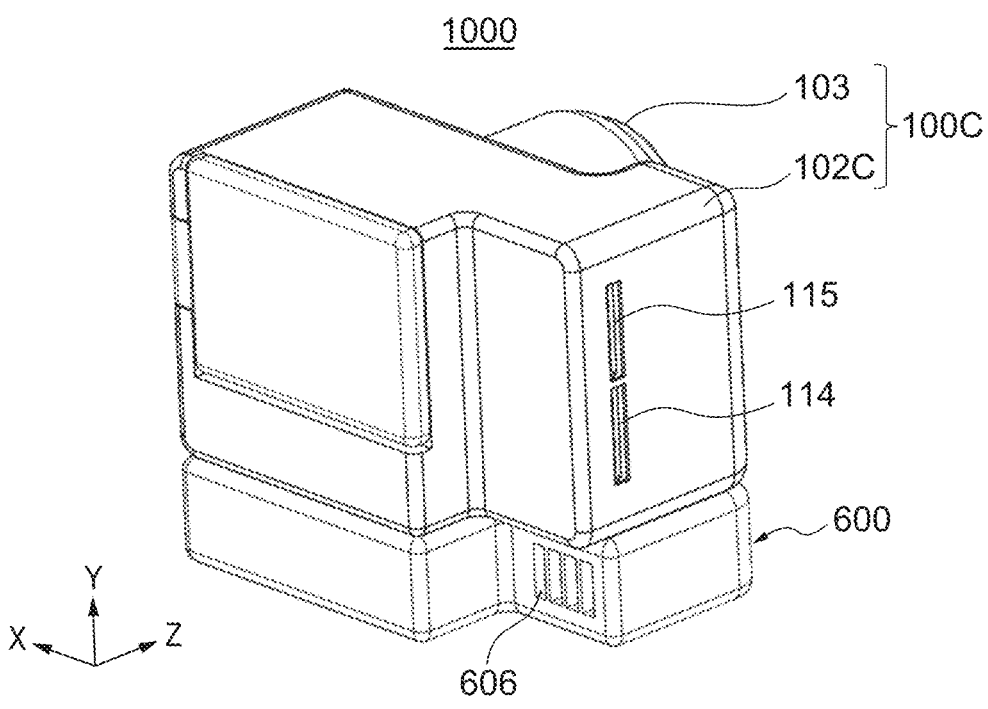
FIG. 18A and FIG. 18B are external appearance perspective views of an image pickup system according to the fourth embodiment.
Figure 18B:
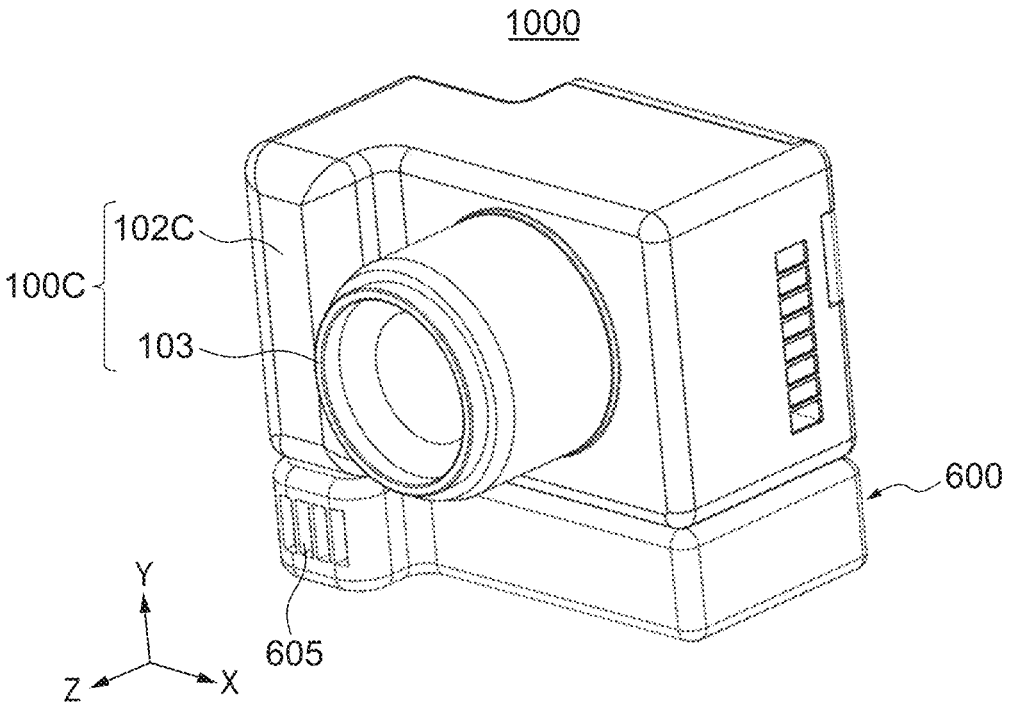

FIG. 18A and FIG. 18B are external appearance perspective views of an image pickup system 1000 configured by attaching the cooling module 600 to the image pickup system 100C. FIG. 18A is a rear perspective view of the image pickup system 1000, and FIG. 18B is a front perspective view of the image pickup system 1000.

The cooling module 600 is normally used for the purpose of enhancing the cooling function that is realized by the cooling duct provided in the image pickup apparatus 102C. Therefore, as also shown below in FIG. 19B, a length in the optical axis direction of a portion of the cooling module 600 disposed on the lower side (the −Y side) of the gripping portion 216 of the image pickup apparatus 102C is set to a length that does not block the first intake port 105.

It should be noted that in the case that the cooling module 600 is attached to the image pickup apparatus 102 described in the first embodiment, the second intake port 106 provided in the image pickup apparatus 102 is blocked by the cooling module 600. Therefore, in order to make the cooling module 600 attachable to the image pickup apparatus 102, it is necessary to take measures such as providing a ventilation path (an air duct) communicating with the second intake port 106 or changing the shape so as not to block the second intake port 106.

In addition, the mechanism for holding the cooling module 600 in an attached state with respect to the image pickup apparatus 102C is not particularly limited. For example, the cooling module 600 may be held (press-fitted) by friction between the partition plate 608 and a wall surface of the battery housing portion 700, or a tripod mount having a female threaded portion may be provided on the bottom surface of the image pickup apparatus 102C, and a male threaded portion that is screwed into the tripod mount may be provided on the cooling module 600.

Figure 19A:
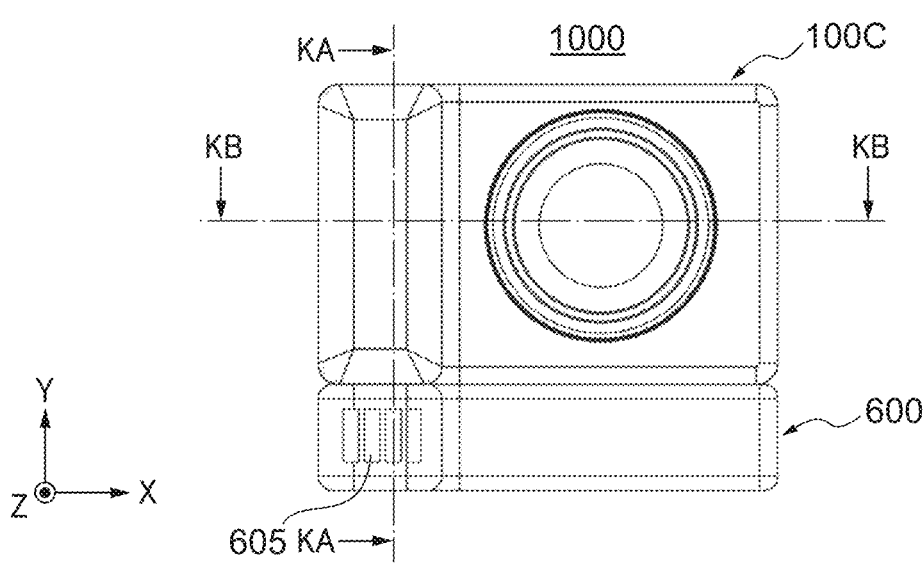
FIG. 19A, FIG. 19B and FIG. 19C are views that illustrate a configuration for cooling various kinds of heat generating elements in the image pickup system shown in FIG. 18A and FIG. 18B.
Figure 19B:
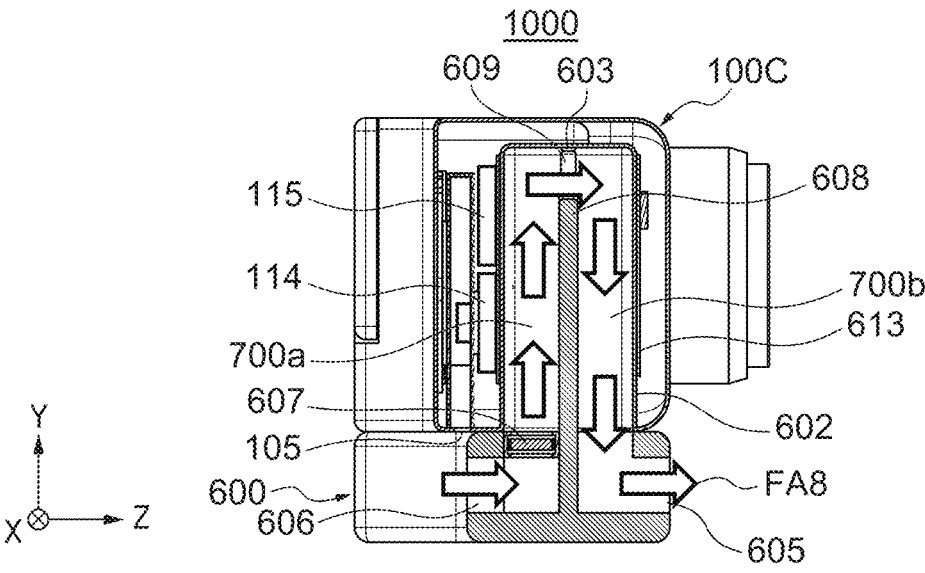
Figure 19C:
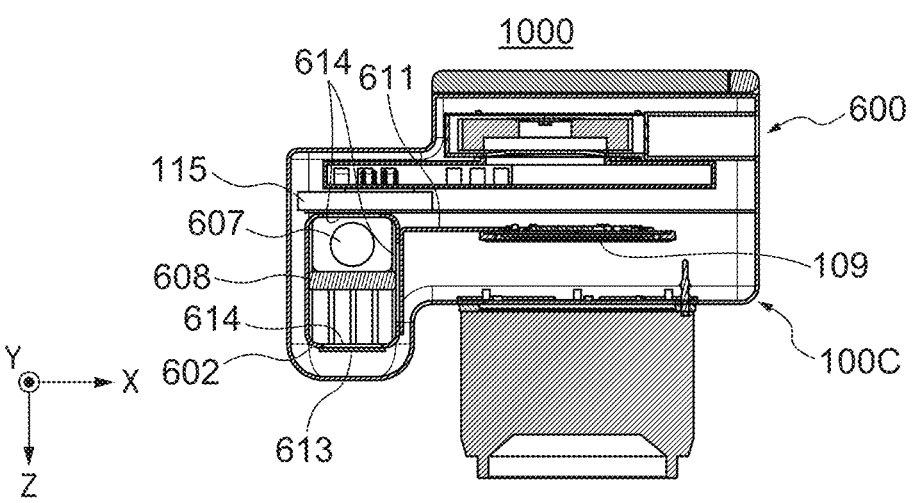

FIG. 19A, FIG. 19B and FIG. 19C are views that illustrate a configuration for cooling various kinds of heat generating elements in the image pickup system 1000. FIG. 19A is a front view of the image pickup system 1000, FIG. 19B is a cross-sectional view taken along arrows KA-KA shown in FIG. 19A, and FIG. 19C is a cross-sectional view taken along arrows KB-KB shown in FIG. 19A.

As shown in FIG. 19B, when the cooling module 600 is attached to the image pickup apparatus 102C, the partition plate 608 is inserted into the inside of the battery housing portion 700, and the electrical contacts 609 come into contact with the electrical contacts 710 provided in the battery housing portion 700. As a result, the power is supplied to the image pickup apparatus 102C from the battery (not shown) housed in the cooling module 600. In addition, the internal space of the battery housing portion 700 is divided by the partition plate 608 into a space on the −Z side 700a and a space on the +Z side 700b in a state of communicating on the +Y side.

When the cooling fan 607 of the cooling module 600 is driven, the outside air flows into the space on the −Z side 700a from the intake port 606. Thus, as indicated by an arrow FA8, the air that has flowed into the space on the −Z side 700a flows through in the order of the space on the −Z side 700a, a communication path on the +Y side, and the space on the +Z side 700b, and then is exhausted from the exhaust port 605.

The control circuit board 111 on which the first medium slot 114 and the second medium slot 115 are mounted is disposed so as to be close to or in contact with the wall surface on the −Z side of the battery housing portion 700. Therefore, the heat transfer from the first medium slot 114 and the second medium slot 115 to the air flowing through the space on the −Z side 700a via the control circuit board 111 and the wall surface on the −Z side of the battery housing portion 700 is performed. In this way, the first medium slot 114 and the second medium slot 115 are cooled, and the warmed air is discharged from the exhaust port 605.

In the fourth embodiment, in addition to cooling the medium slot described above, various kinds of heat generating elements mounted in the image pickup apparatus 102C are cooled by using the battery housing portion 700. Specifically, as shown in FIG. 19C, the heat generated by the image pickup device 109 is transferred to the wall surface on the +X side of the battery housing portion 700 by a heat transfer member 611, and then transferred from the wall surface on the +X side of the battery housing portion 700 to the air flowing through the inside of the battery housing portion 700. As a result, it is possible to cool the image pickup device 109. It should be noted that the heat transfer member 611 may be configured so that the heat generated by the heat generating elements other than the image pickup device 109 is transferred to the heat transfer member 611.

In addition, as shown in FIG. 19B and FIG. 19C, a heat transfer member 613 is disposed in the inside of the gripping portion 216 so as to be close to the wall surface on the +Z side of the battery housing portion 700. By configuring so that the heat generated by the heat generating elements (not shown) provided in the inside of the image pickup apparatus 102C is transferred to the heat transfer member 613, it is possible to perform the heat transfer from the wall surface on the +Z side of the battery housing portion 700 to the air flowing through the inside of the battery housing portion 700 and thus cool the heat generating elements.

It should be noted that as shown in FIG. 19C, cutout portions 614 may be provided in the surfaces of the battery housing portion 700 where the heat transfer member 611 and the heat transfer member 613 are disposed so that a portion of the heat transfer member 611 and a portion of the heat transfer member 613 are exposed to the space of the battery housing portion 700. As a result, it becomes possible to enhance the efficiency of the heat transfer from the heat transfer member 611 and the heat transfer member 613 to the air flowing through the inside of the battery housing portion 700, and to cool the image pickup device 109 and the heat generating elements more effectively. In addition, in the above description, the configuration in which the cooling module 600 is attached to the image pickup apparatus 102C has been described, but the cooling module 600 can also be attached to the image pickup apparatus 102B according to the third embodiment.

Although the present invention has been described above in detail based on its preferred embodiments, the present invention is not limited to these specific embodiments, and the present invention also includes various forms without departing from the gist of the present invention. Further, each of the embodiments described above is merely one embodiment of the present invention, and it is also possible to combine the respective embodiments described above as appropriate. For example, in the above embodiments, the two medium slots are disposed in series along the flow of the outside air flowing into the cooling duct, but if possible, three or more medium slots may be disposed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-110137, filed on Jul. 4, 2023, which is hereby incorporated by reference herein in its entirety.

What is claimed is:

1. An image pickup apparatus comprising:

a gripping portion;

a medium slot that is provided in inside of the gripping portion;

a first intake port;

a second intake port;

an exhaust port;

a cooling duct that connects first and second the intake ports and the exhaust port;

a first heat transfer member that transfers heat from the medium slot to the cooling duct;

a board on which the medium slot is mounted;

a heat generating element that is mounted on the same surface of the board as a surface on which the medium slot is mounted; and a second heat transfer member that transfers heat from the heat generating element to the cooling duct, and wherein the cooling duct includes a cooling fan that flows air into inside of the cooling duct from first and second the intake ports toward the exhaust port; and an intake side duct that is connected to the first and second intake ports and is provided so as to at least partially overlap the medium slot in the gripping portion when viewed from an optical axis direction of the image pickup apparatus, wherein the cooling duct includes a first flow path through which air flowing in from the first intake port when the cooling fan is driven flows and a second flow path through which air flowing in from the second intake port when the cooling fan is driven flows, the medium slot is cooled by air flowing through the first flow path, and the heat generating element is cooled by air flowing through the second flow path, the first heat transfer member is disposed between the medium slot and the cooling duct in the optical axis direction, and the second heat transfer member is disposed between the heat generating element and the cooling duct in the optical axis direction.

2. The image pickup apparatus according to claim 1, wherein the first heat transfer member includes a thin plate-like base portion; and a plurality of fins protruding from one surface of the base portion, the cooling duct includes an opening for causing the plurality of fins to protrude toward the inside of the cooling duct, and the opening is airtightly closed by the base portion being sandwiched between the cooling duct and the medium slot.

3. The image pickup apparatus according to claim 2, wherein the first heat transfer member is disposed so that the plurality of fins are substantially parallel to a direction in which air flows in the inside of the cooling duct.

4. The image pickup apparatus according to claim 1, further comprising:

a board on which the medium slot is mounted, and wherein an image pickup device is mounted on a surface of the board opposite to a surface on which the medium slot is mounted.

5. The image pickup apparatus according to claim 1, wherein the first heat transfer member and the second heat transfer member are made of heat dissipating rubber.

6. The image pickup apparatus according to claim 1, wherein an opening area of the second intake port is larger than an opening area of the first intake port.

7. The image pickup apparatus according to claim 1, wherein at least the two medium slots are disposed in series along the first flow path.

8. The image pickup apparatus according to claim 7, wherein the at least the two medium slots are disposed side by side so as to be adjacent to each other in a height direction of the image pickup apparatus.

9. The image pickup apparatus according to claim 8, wherein the first flow path is formed so that air flows in from a width direction of the image pickup apparatus, and the air flowing in flows in the height direction of the image pickup apparatus.

10. The image pickup apparatus according to claim 7, wherein the at least the two medium slots are disposed substantially parallel to an image pickup surface of an image pickup device included in the image pickup apparatus.

11. The image pickup apparatus according to claim 1, wherein the first and second intake ports are provided on a bottom surface of the image pickup apparatus, and the exhaust port is provided on a side surface of the image pickup apparatus.

12. The image pickup apparatus according to claim 1, further comprising:

a rigid-flexible printed circuit board on which the medium slot is mounted, and wherein the rigid-flexible printed circuit board includes a first rigid portion;

a second rigid portion; and a first flexible portion that connects the first rigid portion and the second rigid portion, the medium slot is mounted on the first rigid portion, and the second rigid portion constitutes a part of the cooling duct.

13. The image pickup apparatus according to claim 12, wherein the first rigid portion and the second rigid portion are disposed opposite to each other in the optical axis direction, the first flexible portion connects the first rigid portion and the second rigid portion in a state of being bent approximately 180 degrees, and each of the first rigid portion, the second rigid portion, and the first flexible portion has a continuous copper pattern formed in an area other than a circuit.

14. The image pickup apparatus according to claim 13, wherein the copper pattern is provided on a surface of the second rigid portion that forms an inner wall of the cooling duct.

15. The image pickup apparatus according to claim 12, wherein fins are mounted on a surface of the second rigid portion that forms an inner wall of the cooling duct.

16. The image pickup apparatus according to claim 12, wherein an operation member is mounted on a surface of the second rigid portion that becomes an outer wall of the cooling duct.

17. The image pickup apparatus according to claim 12, further comprising:

a third rigid portion; and a second flexible portion that connects the first rigid portion and the third rigid portion in a state of being bent approximately 180 degrees, and wherein the third rigid portion constitutes a part of the cooling duct.

* * * * *